(12) United States Patent
Kramer

(10) Patent No.: US 9,870,561 B2
(45) Date of Patent: Jan. 16, 2018

(54) MULTI-USE NUMBERING SYSTEM AND METHOD

(71) Applicant: WILopEN Products, LC, Deerfield Beach, FL (US)

(72) Inventor: Gordon M. Kramer, Coral Springs, FL (US)

(73) Assignee: WILOPEN PRODUCTS, LC, Deerfield Beach, FL (US)

(*) Notice: Subject to any disclaimer, the term of this patent is extended or adjusted under 35 U.S.C. 154(b) by 25 days.

(21) Appl. No.: 14/679,593

(22) Filed: Apr. 6, 2015

(65) Prior Publication Data

US 2015/0213439 A1 Jul. 30, 2015

Related U.S. Application Data

(63) Continuation-in-part of application No. 13/837,250, filed on Mar. 15, 2013, now Pat. No. 9,002,737.

(51) Int. Cl.

| | |
|---|---|
| G06Q 20/34 | (2012.01) |
| G06K 19/06 | (2006.01) |
| B42D 5/02 | (2006.01) |
| B42D 15/04 | (2006.01) |
| B42F 17/08 | (2006.01) |
| G06Q 30/06 | (2012.01) |
| B42D 25/20 | (2014.01) |
| G06Q 30/02 | (2012.01) |
| B42D 5/00 | (2006.01) |

(52) U.S. Cl.
CPC ........... *G06Q 20/347* (2013.01); *B42D 5/025* (2013.01); *B42D 15/045* (2013.01); *B42D 25/285* (2014.10); *B42F 17/08* (2013.01); *G06K 19/06009* (2013.01); *G06Q 30/0601* (2013.01); *G06Q 30/0619* (2013.01); *B42D 5/002* (2013.01); *B42D 5/027* (2013.01); *G06Q 20/34* (2013.01); *G06Q 20/354* (2013.01); *G06Q 30/0218* (2013.01); *G06Q 30/0254* (2013.01)

(58) Field of Classification Search
CPC ............................ G06Q 20/347; G06Q 20/354
USPC .......................................................... 235/380
See application file for complete search history.

(56) References Cited

U.S. PATENT DOCUMENTS

2004/0030647 A1* 2/2004 Hansen ................. G06Q 20/02
705/40
2005/0108127 A1* 5/2005 Brown .................... G07F 17/32
705/35

(Continued)

*Primary Examiner* — Toan Ly
(74) *Attorney, Agent, or Firm* — Johnson & Martin, P.A.; James David Johnson

(57) ABSTRACT

A numbering system is provided having an identifier with hexadecimal, vigesimal, quadrivigesimal, or any other suitable alphanumeric characters includable on a card and an account identifiable using the identifier. The card can be a gift card, a customer loyalty card, or a customer incentive card. An interface may be connected to a communications network that is accessible to associate the identifier with an account and manage funds associable with the account. Funds data may be associable with the account and storable on the remote server, the funds data relating to the funds transferred by a user to a card issuer. The identifier may be storable on the card in an electronically readable format, and may be included on the card via printing and/or imprinting. A method is provided for using the numbering system.

18 Claims, 16 Drawing Sheets

(56) References Cited

U.S. PATENT DOCUMENTS

2010/0017278 A1\* 1/2010 Wilen ................ B42D 15/045
  705/14.2
2012/0163269 A1\* 6/2012 Shuster ................ H04W 4/206
  370/312

\* cited by examiner

MULTI-USE NUMBERING SYSTEM AND METHOD

CROSS-REFERENCE TO RELATED APPLICATION

This application is a continuation-in-part application of and claims priority from U.S. continuation-in-part patent application Ser. No. 13/837,250 filed Mar. 15, 2013, which is a continuation-in-part of U.S. nonprovisional patent application Ser. No. 12/464,740 filed May 12, 2009, which is a nonprovisional of U.S. provisional patent application Ser. No. 61/052,377 filed May 12, 2008. The foregoing applications are incorporated in their entirety herein by this reference.

FIELD OF THE INVENTION

The invention relates to multi-use numbering systems. More particularly, the invention relates to systems and methods for distributing a plurality of non-activated gift cards, customer loyalty cards, or customer incentive cards with a numbering system, along with advertising, directly to a home of a potential gift giver or other card user for activation, and optionally in the case of gift cards, for delivery by and from the gift giver to a gift recipient.

BACKGROUND

Significant changes have taken place in the payment systems of American businesses. The growth of electronic pre-paid products, stored value cards, debit cards, and gift cards, both open and closed loop, have resulted in changing payment habits and business opportunities, new technologies, and new methods of distribution.

The market for pre-paid products, stored value cards, debit cards, customer loyalty cards, and gift cards continues to grow. Traditionally, magnetic stripe plastic financial transaction cards have been sold individually at retail to be activated at the time of purchase, at the point of purchase. The purchaser at the point of purchase places a monetary amount on the card through register activation. That is, the buyer adds value to a previously valueless piece of plastic, and transforms the card into a monetary instrument. By adding a cash value to these zero balance cards, the cardholder can purchase services or merchandise at a cost up to the gift cards value on either a closed or open looped basis.

In many cases, the prepaid card buyer will insert the activated gift card into a greeting card, and then into an envelope, in order to create a gift or present that can be handed to or mailed to the intended recipient. The use of prepaid or stored value cards as gift items has sky rocketed over a comparatively short amount of time, affecting the sale and use of greeting cards specifically, and retailing, in general. The convenience and assured satisfaction of the recipient have factored greatly in the rise of gift cards.

The retailer benefits from this transaction because the consumer pays in advance of purchase to the seller of the gift card. No interest or guarantee of repayment is given, and the monetary value of the card can only be retrieved when the person in possession of the card makes a purchase from a specific retail brand in a closed loop situation, or almost any retailer in an open loop situation. Post-transaction, once the designated monetary value is reached, some open-loop cards may then be reloaded with additional funds.

In financial reality, consumers are, in essence, loaning large amounts of money, at no interest, to the issuing companies. Some of that advance payment may be lost to the cardholder since no change is given when the cardholders purchase amount is less than the amount designated on the card. Leftover monies are not generally of a large enough denomination to be used for additional purchases, and in many cases, are never retrieved. Generally speaking (and due to the anonymity of a plastic card), there are no records being kept in relation to the amount bought, or by whom, or where nor the amount being spent, or by whom. Neither is there a report given to the possessor of the card about any balances that may be left. Recent changes in the law have altered card issuers' ability to access and use funds with which gift cards and other financial card products are funded. The funds are available to a card issuer for a period of 3-5 years, after which the funds escheat to the state government where the card was issued.

Most issuers have recently stopped charging service fees and are now required to include an expiration date on issued cards. Most card issuers are seeking additional ways to enhance the structure and delivery of gift cards because consumers continue to place more emphasis on prepaid shopping and more dollars on gift cards each year. While there are a variety of reasons for the rise in stored value and prepaid gift card the overwhelming reason for consumers is convenience.

SUMMARY

The invention relates to systems and methods for distributing and activating gift cards, customer loyalty cards, customer incentive cards, direct mail, publications, and advertising so as to provide an online or virtual shopping mall (e.g., a gift card mall) in the home of a gift giver or other card user. The system can include a unitary single-sheet form, an optional package envelope, an activation system, a delivery system, and a redemption system. A plurality of the forms can be inserted into the package envelope for delivery to the gift giver or the cards can be distributed at a retail store or other location or through direct mail. The gift giver can select one or more of the gift cards for activation and delivery to a gift recipient. Both the gift giver and the gift recipient are consumers. The gift recipient can then redeem the activated gift received from the gift giver for a redemption item sold or provided by a retailer, service provider, or manufacturer. The redemption item can be a good, service, or money. The redemption item can be purchased at an online shopping mall, by telephone, or in a retail store. The forms constitute a new form of media that permit retailers, manufacturers, advertisers, and system operators to distribute not only gift cards but other printed media as well, e.g., advertising, informational materials, instructions, publications, and entertainment-related materials such as commercial games associated with advertising-supported rewards point systems that may be used by a consumer to earn and redeem points for goods, services, or money. A hexadecimal, vigesimal, quadrivigesimal, or any other suitable numbering system may be included by the gift card to identify the gift card, the gift giver, and/or the gift recipient and to associate a value with the gift card.

Where gift cards are referenced herein, the apparatuses, systems, and methods of the invention may also be used with customer loyalty cards and/or customer incentive cards. For purposes of convenience and without limiting the scope of the invention, the description that follows will refer primarily to gift cards although the invention may also be used with customer loyalty cards and/or customer incentive cards.

Where hexadecimal numbers used as identifiers are referenced herein, the apparatuses, systems, and methods of the invention may also be used with vigesimal numbers, quadrivigesimal numbers, or any other suitable alphanumeric characters includable on a card. For purposes of convenience and without limiting the scope of the invention, the description that follows will refer primarily to hexadecimal numbers being used as identifiers although the invention may also be used with vigesimal numbers, quadrivigesimal numbers, or any other suitable alphanumeric characters where such hexadecimal number usage is described.

Methods for distributing and activating gift cards are also described herein. One method can include the steps of attaching a non-activated gift card to an article, selling the article, and activating the gift card from a remote location. The step of selling can include (1) allowing a consumer to buy the article at a retail store, (2) allowing a consumer to buy the article over a telephone line, and delivering the article to a home of a consumer or (3) allowing a consumer to buy the article over an internet connection, and delivering the article to a home of a consumer. That is, the article can be sold to a consumer at a specific point of purchase, the specific point of purchase being either a retail store or virtual store. In another method, a plurality of gift cards can be distributed to one or more known gift givers who intend to give a gift to a gift recipient or to a plurality of potential gift givers for distribution to a plurality of gift recipients known to the plurality of potential gift givers by each potential gift giver who elects to send a gift using the systems and methods described herein.

The step of activating the gift card can be completed by a gift giver in a store, online, or by telephone. Once the gift giver has activated the gift card, which includes funding the card, the gift giver may deliver the gift card to a gift recipient by mail, courier service, hand delivery, online transmission, or other delivery means. Gift givers may be required to purchase non-activated gift cards or non-activated gift cards may be distributed freely, in physical or virtual form, to gift givers. When the gift recipient receives the activated gift card, the gift recipient can redeem the gift card for goods, services, or money either online, in a brick-and-mortar retail store, or by telephone.

The step of activating the gift card can be performed by the consumer and performed at a location remote from the store. During activation, the consumer can allocate selected merchandise, a selected service, or a dollar value to the gift card, thereby providing the gift giver with a convenient way to buy and send a gift to a gift recipient.

Additionally, these gifts cards may be distributed individually or with greeting cards and envelopes. The greeting card and envelope may be personalized as an occasion card or the personalized nature of the greeting card and envelope may act as a third party endorsement for the specific brand name.

Additionally, during activation a consumer may select and write a unique code for security identification for the activation. These gift cards may be redeemed at a retail store in person, by telephone, or online.

Other methods of distributions may include mailing the non-activated gift card to a home of the consumer, including them in a publication (e.g., a publication that contains numerous printed gift cards and instructions for activating one or more of them), and/or inserting the non-activated gift card into newspapers, catalogs and other such print marketing.

Using the systems and methods described herein provides an advantage to gift givers in that a plurality of gift cards from one or more retailers, service providers, or card issuers, is delivered direct to the home (for example, as a gift card mall in the home) of a gift giver so that the gift giver may avoid traveling to a retail location or kiosk that sells or distributes gift cards to obtain a gift card as well as standing in line to purchase or activate the gift card selected. The systems described herein also provide a single point of purchase for the gift giver to activate and fund a selected gift card.

The systems and methods also provide the issuing merchant the ability to use the unique number to track gift giver and gift recipient gift card purchase and usage data.

The systems and methods also provide an advantage in that, by using these systems and methods, consumers can avoid having to return a gift by sending a gift card for a product or service to a gift recipient that the gift recipient can either redeem or select a different gift or re-gift According to an embodiment of the present invention, a numbering and tracking system is provided. The numbering and tracking system can include an identifier that includes hexadecimal, vigesimal, quadrivigesimal, or any other suitable alphanumeric characters includable on a card. The card can be a gift card, a customer loyalty card, or a customer incentive card. The system also includes an account identifiable using the identifier, an interface connected to a communications network, and a remote server connected to the communications network. The interface can be accessible to associate the identifier with an account and manage funds associable with the account. The system can further include funds data associable with the account and storable on the remote server, the funds data being relating to the funds transferred by a user to a card issuer. The system can also include an electronically readable format includable by the gift card to store the identifier. The identifier can be included on the card via printing, imprinting, or both printing and imprinting, and can be readable from the electronically readable format using a computerized device with a processor and memory.

In another aspect, the user can be a gift giver.

In another aspect, the identifier can include a reference number that identifies an offer to create the account and is associable with information relating to the account. The account can be associable with an account number upon creation.

In another aspect, the reference number can be usable to open a plurality of accounts, wherein each of the plurality of accounts is associable with a corresponding account number.

In another aspect, the reference number can be includable in an advertisement to solicit creation of the account, and the advertisement can be includable in a publication.

In another aspect, the account can be observable to track purchasing habits.

In another aspect, the electronically readable format can include at least one format selected from among: a QR code, a magnetic strip, a bar code, and a memory storage chip.

According to an embodiment of the present invention, a numbering system is provided that includes an identifier includable on a card, wherein the card can be a gift card, a customer loyalty card, or a customer incentive card. The system can further include an account identifiable using the identifier, an interface connected to a communications network, and a remote server connected to the communications network. The interface can be accessible to associate the identifier with an account and manage funds associable with the account. The system can also include funds data associable with the account and storable on the remote server, the funds data relating to the funds transferred by a user to a card issuer. The account can be observable to track purchasing habits. The identifier can include a reference number that identifies an offer to create the account and is associable with information relating to the account, and the account can be associable with an account number upon creation.

In another aspect, the identifier can include hexadecimal, vigesimal, quadrivigesimal, or any other suitable alphanumeric characters.

In another aspect, the identifier can be included on the card via printing, imprinting, or both printing and imprinting.

In another aspect, the reference number can be usable to open a plurality of accounts, wherein each of the plurality of accounts is associable with a corresponding account number.

In another aspect, the reference number can be includable in an advertisement to solicit creation of the account, and the advertisement can be includable in a publication.

In another aspect, the numbering system can further include an electronically readable format to store the identifier, wherein the identifier can be readable from the electronically readable format using a computerized device with a processor and memory.

In another aspect, the electronically readable format can include at least one format selected from among: a QR code, a magnetic strip, a bar code, and a memory storage chip.

According to an embodiment of the present invention, a method is provided for using a numbering system comprising the steps of: (a) including an identifier comprising hexadecimal, vigesimal, quadrivigesimal, or any other suitable alphanumeric characters on a card, wherein the card can be a gift card, a customer loyalty card, or a customer incentive card; (b) accessing an interface connected to a communications network; (c) associating the identifier with an account and manage funds associable with the account using the interface; and (d) associating funds data with the account to be stored on a remote server connected to the communications network, the funds data relating to the funds transferred by a user to a card issuer. The identifier can be includable on the card via printing, imprinting, or both printing and imprinting. The identifier can be storable by the card in an electronically readable format. The identifier can be readable from the electronically readable format using a computerized device with a processor and memory.

In another aspect of the method, the identifier can include a reference number that identifies an offer to create the account and is associable with information relating to the account, and the account can be associable with an account number upon creation.

In another aspect of the method, the reference number can be usable to open a plurality of accounts, wherein each of the plurality of accounts can be associable with a corresponding account number.

In another aspect of the method, the reference number can be includable in an advertisement to solicit creation of the account, and the advertisement can be includable in a publication.

In another aspect of the method, the method can further include the step of: (e) observing the account to track purchasing habits.

In another aspect of the method, the electronically readable format can include at least one format selected from among: a QR code, a magnetic strip, a bar code, and a memory storage chip.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

Figure 1A:
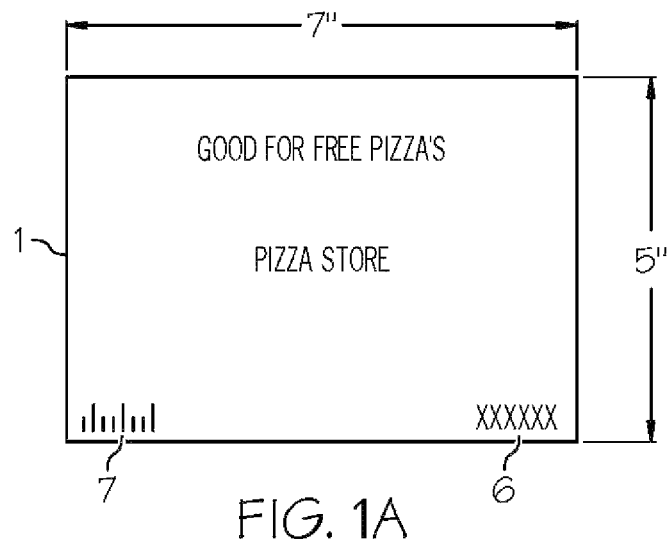
FIG. 1A is a top view of a first embodiment of a gift card.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides systems, forms, publications, and methods for distributing gift cards (or customer loyalty cards or customer incentive cards) and advertising to customers. The customers can be consumers such as, for example, gift givers and gift recipients.

The present invention is directed towards a convenient way for consumers and sellers to sell, buy, and distribute gift cards. That is, the present invention includes, among other things, distributing either (1) a single set of a number of valueless (zero balance) gift cards or (2) a single set that contains two or three individual elements: a gift card, an optional greeting card and an optional envelope (hereinafter, a gift card package). Each gift card may include a unique identifier, such as a hexadecimal, vigesimal, quadrivigesimal, or other suitable unique alphanumeric number, to associate the gift card with an account and/or a value.

Hexadecimal, vigesimal, quadrivigesimal, and certain other suitable numbers provide an infinite supply of traceable numbers from which to choose and assign to a gift card, an advertisement, a publication, a product or service offer, a customer, a gift giver, a gift recipient, an account, or any other item, person, entity, or thing for which data mining or tracking or record keeping is desired. Hexadecimal numbers are more secure than standard 16-digit ISO credit, debit, and gift card numbers because they are not issued sequentially or in common groups and because the check digit calculations are complex and unpublished by an issuer of the hexadecimal numbers as opposed to the Luhn check digit algorithm used with conventional 16-digit ISO account numbers. Hexadecimal numbers can also be of any number of alphanumeric characters.

In addition to hexadecimal numbers, the unique identifier can also utilize other alphanumeric numbering systems including, for example, extended binary coded decimal interchange code (EBCDIC) or vigesimal (i.e., base 20) numbering.

The present invention also allows any number of sets of the above (1 or 2), packaged as one individual product. All gift cards are to be sold or given away as a premium incentive or a gift and, as with standard gift cards, the value of the card (when activated) can be in cash denomination or redeemable for specific loyalty points, incentives, branded merchandise or for a specific service.

The present invention is a more convenient method of distributing gift cards because it offers convenience in its delivery, pass-along potential, and all-in-one packaging.

The present invention's direct-to-consumer approach delivers a single gift card, or multitude, of gift cards direct to the home, office, or other address of a gift giver. The individual cards are then activated after they have been received in the home, e.g., by phone, Internet or an in-store visit, as needed by the gift giver. Once the cards are activated, the cards can be sent on to a gift recipient via the initial cardholders own greeting card, or one supplied by the gift card distributor.

On a commercial basis, the gift card package (i.e., stored value card, greeting card and envelope) would be available for purchase at retail in both a closed and open loop scenario. In some cases, the present invention may require a second activation once the recipient uses the activated card. This two-pronged activation, however, helps the issuer (the store) track and control the buying chain.

Like the standard method of selling prepaid gift cards, the present invention can employ as little as one valueless gift card sold and activated at retail. Or, unlike single card standard gift card sales, the present invention also has an option that offers a packet of gift cards that contains one or more valueless cards, with or without greeting cards and envelopes. These can be made available for purchase or distributed free as a single product, and activated at retail and/or at remote locations.

Although it is advisable that the size and shapes of the cards be the same as today's standard gift cards, it is not necessary. Neither is the use of magnetic stripes, chips or plastic substrates or coatings necessary.

Figure 1B:
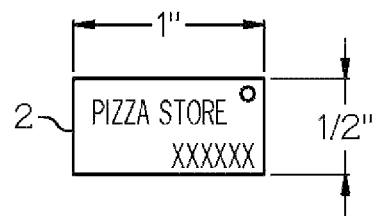
FIG. 1B is a top view of a second embodiment of the gift card.
Figure 1C:
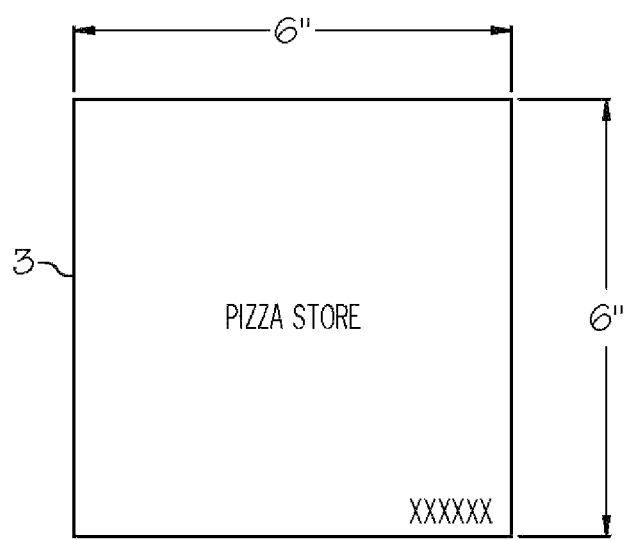
FIG. 1C is a top view of a third embodiment of the gift card.

FIGS. 1A-1C show how arbitrary numbers 6 can be applied to inch greeting card. The numbers 6 can be a gift card number associated with a gift card account. FIG. 1A shows one embodiment of a gift card of the system. For example purposes only, the gift card of this embodiment can be a standard 5"×7" card 1. FIG. 1B shows another embodiment of a gift card of the system. For example purposes only, the gift card of this embodiment can be a 1"×½" card 2 with a hole in its corner for attaching the card to a key chain. FIG. 1C shows still another embodiment of a gift card of the system. For example purposes only, the gift card of this embodiment can be a large 6"×6" card 3. Gift cards of various other sizes and shapes can be manufactured for use with the systems and methods described herein. Others cards can be manufactured and sold as gift card sets, for example, multiple gift cards placed into a single package for sale or free distribution, with or without the need of retail activation.

Figure 2:
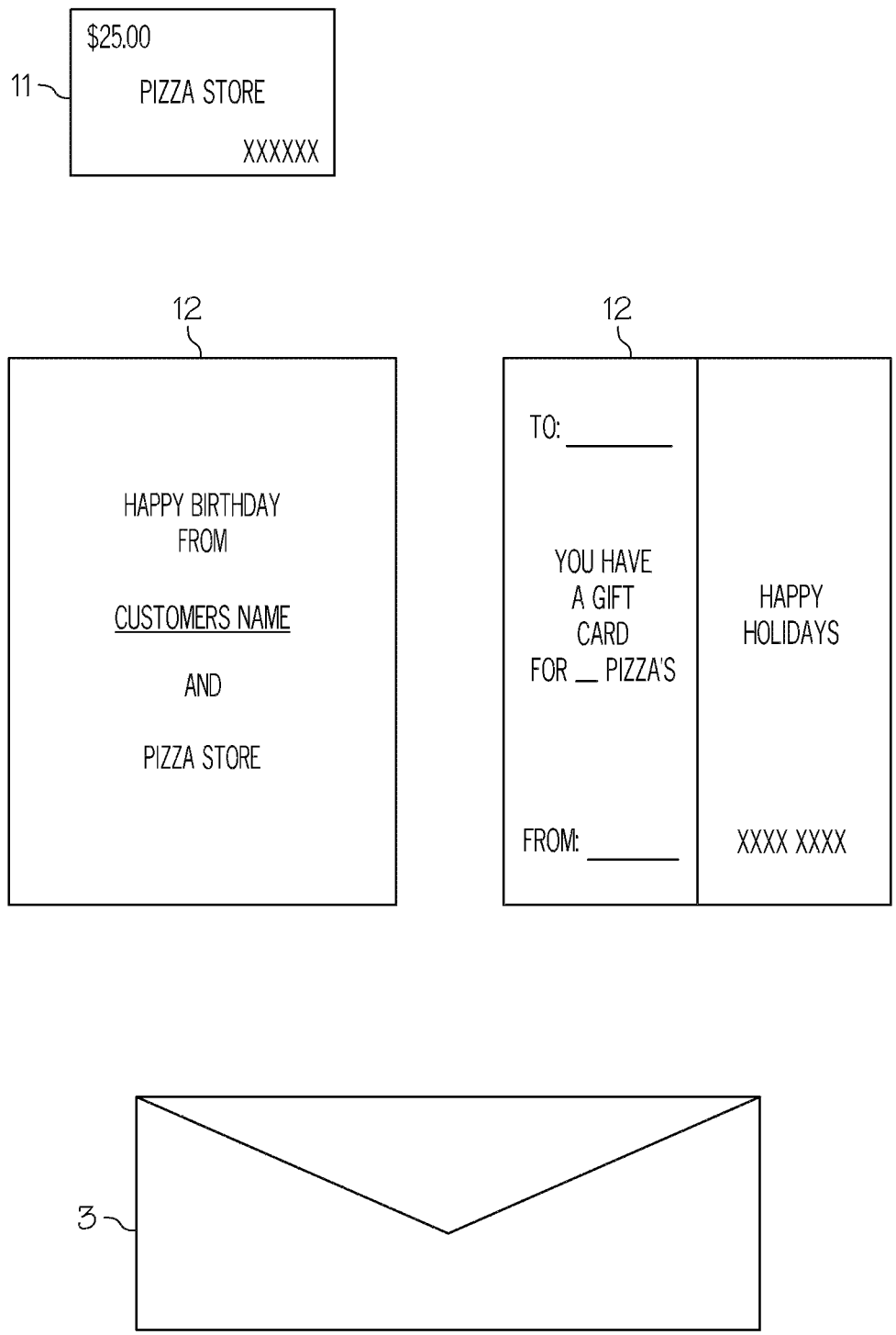
FIG. 2 is a top view of contents of a gift card package.

FIG. 2 shows a multi-piece approach with gift card(s) 11, and the addition of a greeting card(s) 12, and envelope(s) 13.

In this an embodiment merchandise gift cards 11 are to be distributed as packages 10. Each gift card package 10 can contain a number of the same card 11 to be sold or given away free. For example: 12 gift cards each good for 6 free pizzas could be sold or given away free.

Each gift card package 10 may also contain a number of different merchandise cards 11. For example, one card redeemable for pizza, another card redeemable for a toy, and another card redeemable for a movie rental or movie on-demand, can be packaged together and sold or given away for free.

Each gift card package 10 may also contain a number of pre-fixed dollar amount gift cards (e.g., $10, $15, $20, and $25 gift cards) that may be sold or given away free. In another embodiment, a number of any dollar value gift cards can be packaged together and sold or given away free. In still another embodiment, multiple cards for various brands like Macy's, Saks, Bloomingdale's, Pizza Hut, etc., can be packaged as one product and sold or distributed free.

The gift cards products 10 also may contain any combination of additional components packaged as a single gift card product: gift cards 11, greeting cards 12, mailing envelopes 13 and catalogs (not shown) or menus (not shown) of choices of available food or merchandise.

Figure 3A:
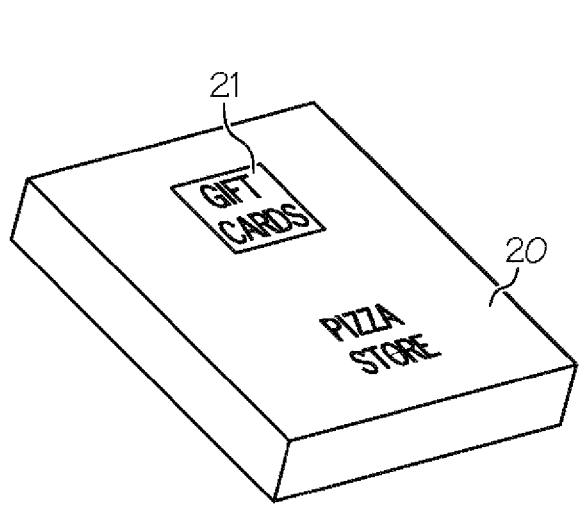
FIG. 3A shows a first embodiment of a gift card distribution method.
Figure 3B:
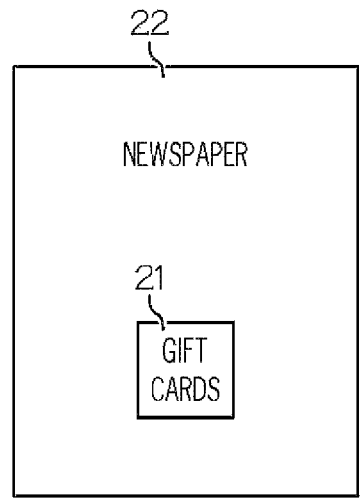
FIG. 3B shows a second embodiment of the gift card distribution method.
Figure 3C:
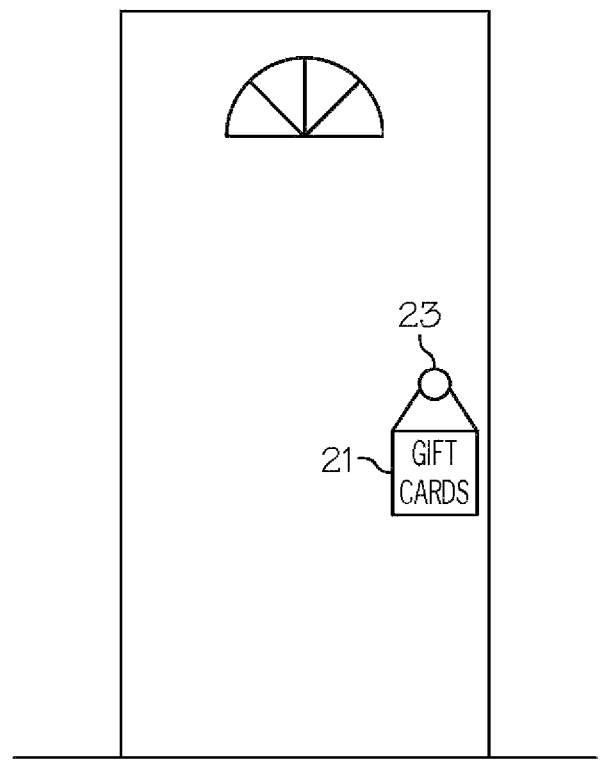
FIG. 3C shows a third embodiment of the gift card distribution method.

In another embodiment, FIGS. 3A-3C, the gift card product 21 could be distributed at no cost, e.g., on top of pizza boxes 20, in delivery packages and shopping bags, piggy-backed with other items being mailed, in sample packs (see FIG. 3B), inserted into newspapers 22 and other publications, direct mailed, distributed at retail, as part of a greeting card, thrown on a drive way or hung on a door 23 (see FIG. 3C). In another embodiment the gift card product could be distributed as a for-pay product at retail.

Even though activation of the present invention may be made at retail, the present invention is designed to be activated remotely from a home, an office or any other remote location. Activation is accomplished by calling or going on-line to prepay for merchandise or to apply monetary value the gift cards. This is one factor that motivates gift card usage.

This method is more convenient because consumers need not stand in a checkout line to buy or activate a gift card, activation is done at the gift giver's convenience, and cards are activated as needed. The cards can be equipped with all the components needed to create a superior gift (premium), and packages can have multiple combinations of products and services.

The gift card product 10 may also be sold in a variety of sizes (FIGS. 1A-1C): (i) as a package of single or multiple gift cards 1, (ii) as a package of gift cards 1 with accompanying greeting cards 12 and envelopes 13, or (iii) as a single greeting card 11, gift card 12 and envelope set 13. Any of these combinations can also be packaged as multiples and inserted into a separate box or envelope.

Specific numbers 6, bar codes 7 (including linear bar codes and matrix bar codes, for example, QR codes), other codes, magnetic stripes, memory chips or any other item used for the purposes of an identification, security and activation may also be included. For example, the numbers 6 can be a gift card number associated with a gift card account. The gift card account can include information related to one or more of a redemption item (e.g., specific goods, specific services, or money), personal information of the gift giver, and personal information of the gift recipient. Bar codes and other types of unique identifiers discussed herein can readable by cameras in tablet computers and cellular phones including smart phones and by other computing devices having cameras and scanning devices.

In addition, a greeting card 12 can also have a gift card and multi-page catalog affixed to it, a pop-up card, catalog, greeting card format. These individual products can be self-mailed or inserted into an envelope for mailing.

An important feature of the gift card package 10 is that it drives consumer traffic to specific stores. For example, during activation consumer traffic is driven to a store's website for online activation. This creates an additional selling opportunity. It drives visitors to specific web pages or allows viewers to find additional merchandise to substitute and/or add to their gift card amount. This online driver is particularly important, as the Internet becomes a new form of entertainment and sales with full motion video, audio, corporate sponsorship, and product placement.

Below is an example for using gift cards in a pizza delivery setting (see FIG. 4). The home delivery industry offers a wholly new market for prepaid or stored value card distribution. For example, use of pizza companies' direct-to-home delivery, with or without a new and more sophisticated ordering system, creates a new market for the gift card product and its convenience stimulates usage. The increased convenience also enhances trademark recognition and loyalty to the brand.

Figure 4:
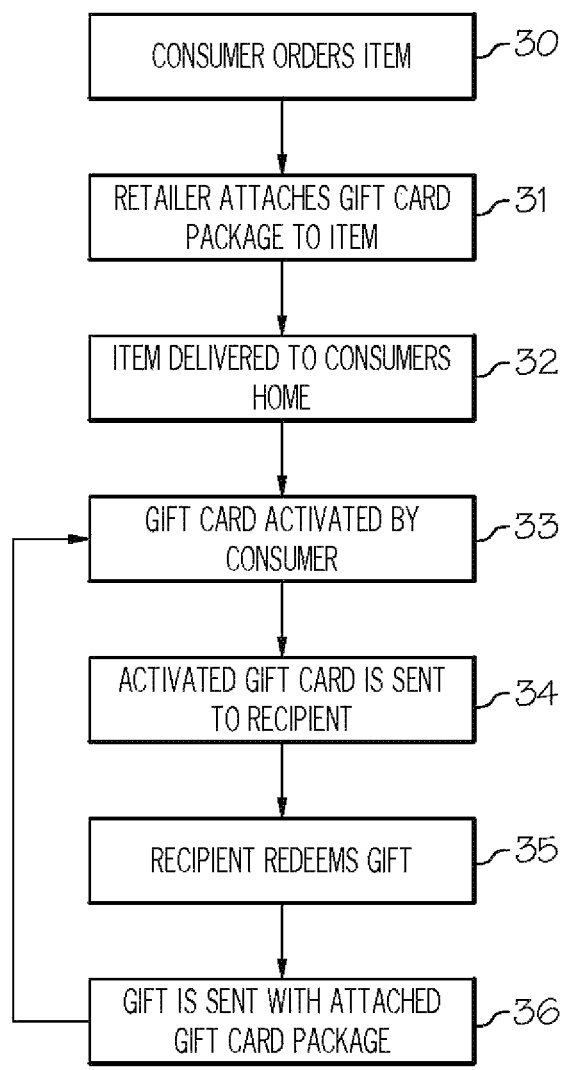
FIG. 4 is an exemplary flow chart illustrating steps of the gift card distribution method.

As shown in FIG. 4, a consumer orders a pizza from a pizza store 30. A gift card package containing a number of the gift card products (along with instructions for their use) are attached to a pizza delivery box 31 and distributed at the same time as an in-home (or in-office) pizza delivery and at no additional cost 32. The gift card packaging can be affixed to the top of the pizza box, be hand delivered simultaneous with the pizza delivery, or act as a door hanger.

Each individual gift card can be used to prepay the purchase of a cheese pizza, and can then be passed along as a gift to a number of recipients by the original pizza buyer. To activate the card, the original pizza buyer simply calls or goes online to a designated number or site, identifies themselves, enters the code on the card they have in hand (or the consumer may designate their own unique code), provides the appropriate payment debit or credit card information 33, and designates the person and address to whom they are sending the gift.

Then, the original pizza buyer activates the gift card, places it in the greeting card with the appropriate messaging, inserts both into the enclosed envelope, attaches his own stamp, and mails to the gift recipient 34. Because the card is hand addressed and mailed first class, the receiver will most likely recognize the sender, open the envelope, and feel good about receiving the gift. Their next course of action is to start the redemption process, stimulating a trail for customers who may not know or have used the specified gift brand before.

In order to redeem the gift, the recipient calls or visits the same number or site, identifies himself, and provides the number or code on their specific gift card and their level of redemption (the entire gift amount or a portion) 35. With that information, the order is confirmed and the gift recipient is urged to upgrade their order with extras, i.e., toppings, fountain drinks, etc., that may be paid at the time of delivery. At the same time, the gift recipient is asked if they want to send a thank you note to their benefactor.

When the gift pizza is delivered, it too has a package of gift cards adhered to its top to perpetuate the buying chain 36. The end result of the transaction is a database of sender and the receiver's names, addresses and phone numbers, credit information, the total number of pies purchased, and tracking for number of pies used. Additional information can be gathered which can be advantageous for security, general information, surveys and upgrading purposes.

System for Distributing Gift Cards and Advertising

Figure 5A:
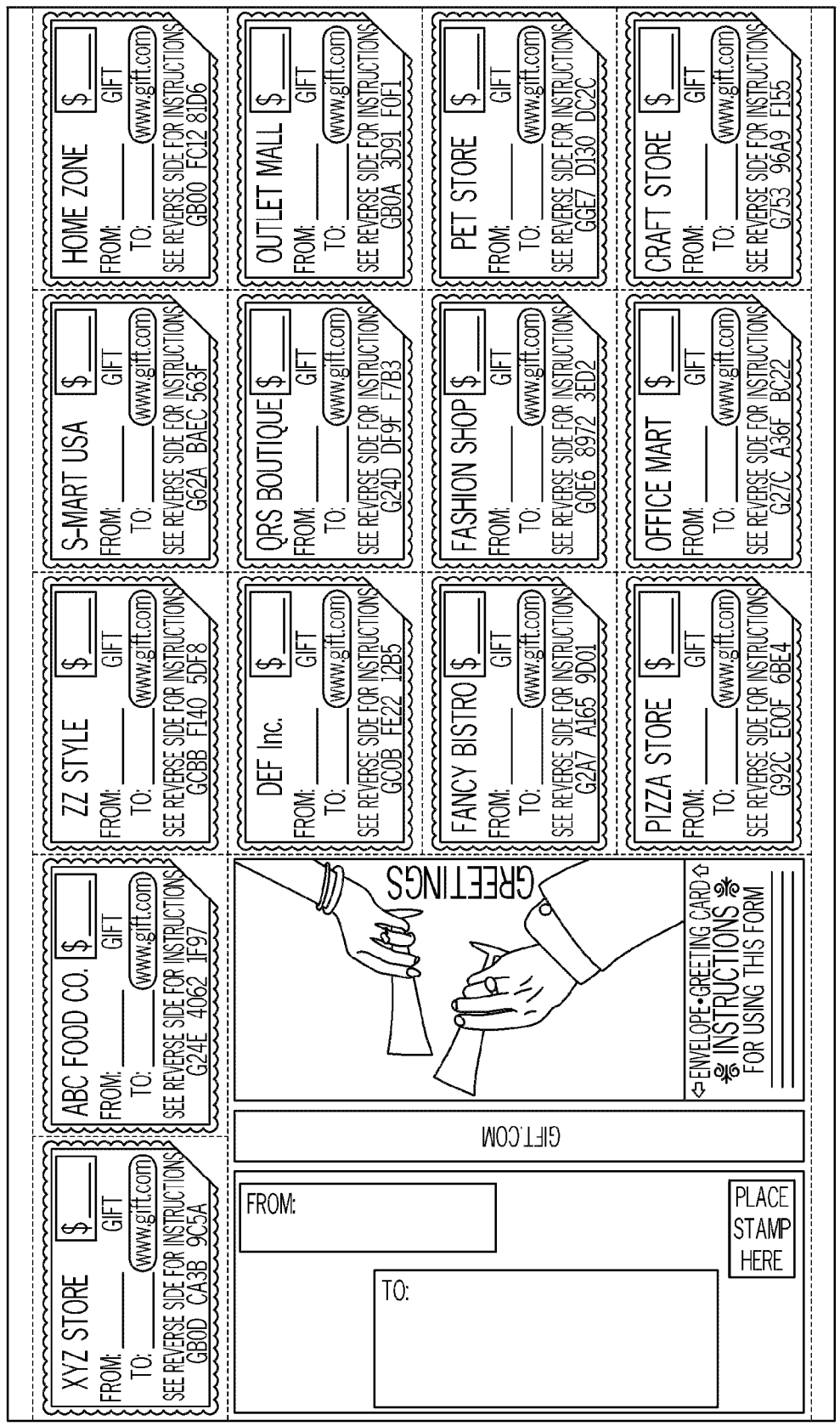
FIG. 5A is a top view of a unitary single-sheet gift card and advertising form.
Figure 5B:
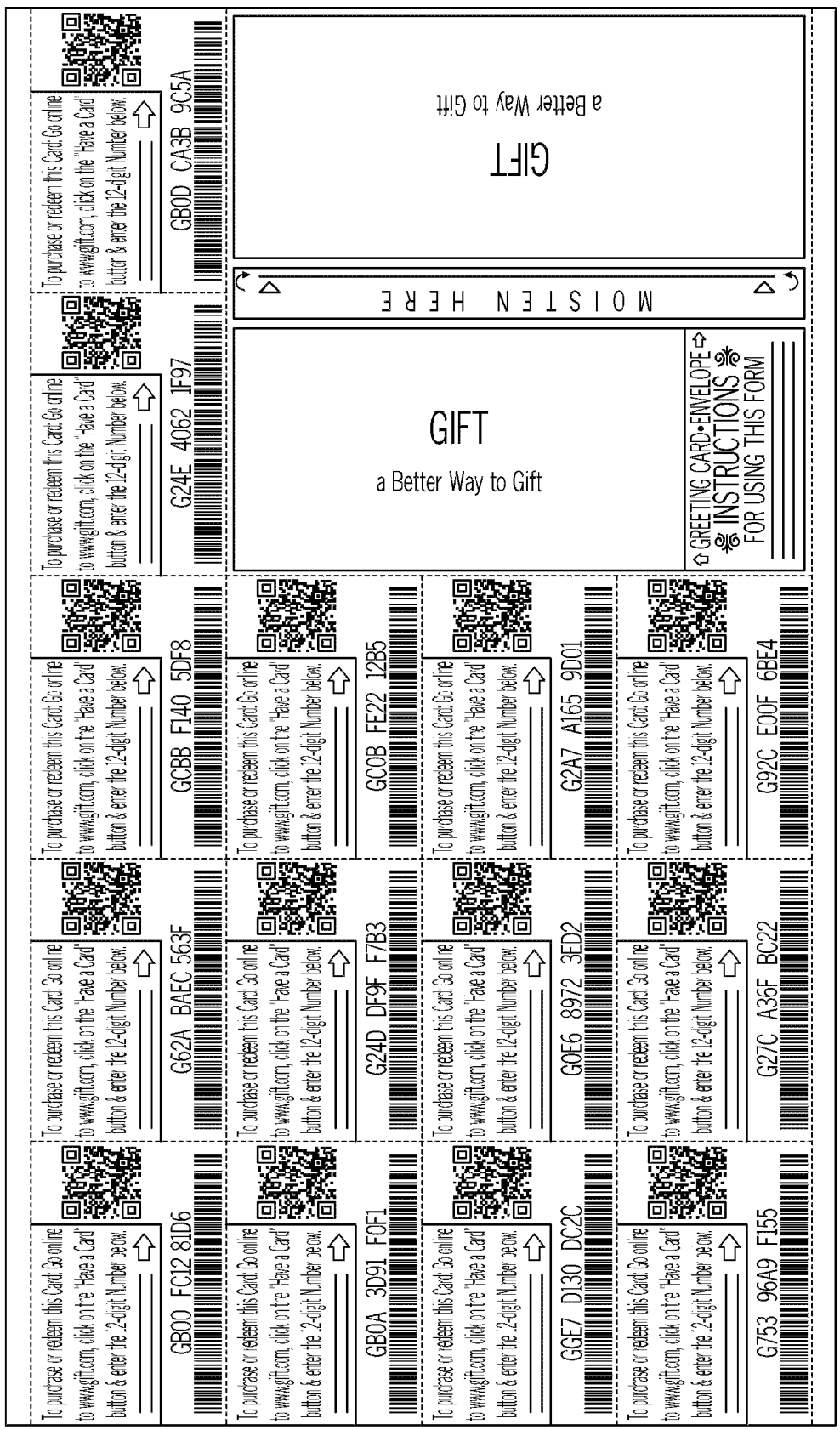
FIG. 5B is a bottom view of the unitary single-sheet gift card and advertising form of FIG. 5A.

The invention features a system for distributing gift cards and advertising. The system can include a unitary single-sheet form, a package envelope, an activation system, a delivery system, and a redemption system. As shown in FIGS. 5A and 5B, the unitary single-sheet form can feature a plurality of separable pieces that can include a plurality of non-activated gift cards, an optional gift envelope, and an optional correspondence piece. In embodiments of the system that do not include a gift envelope or a correspondence piece, the user (e.g., a gift giver) can obtain and use his or her own gift envelope or correspondence piece, or both as desired when delivering the gift card after activation to a gift recipient. The form can be a form that is printed during manufacturing, imprinted by a gift giver or other consumer or person after manufacturing, or both printed and imprinted. One or more of the forms can be inserted into the package envelope for delivery to the gift giver. In some embodiments, other sheets of material, e.g., advertising buck slips, may also be inserted into the package envelope along with the form or forms for delivery to the gift giver. As used herein, package envelope can mean an envelope, a wrapper, or other packaging suitable for enclosing one or more of the forms for delivery to the gift giver. In alternate embodiments in which the publication is bound or inserted in a magazine or newspaper, the magazine or newspaper can serve as the package envelope as a delivery means. In embodiments in which a plurality of the published forms are inserted into a package envelope, invoice envelope, or marriage mail envelope, are inserted into a magazine, newspaper, or other publication, are bound into a magazine, newspaper, or other publication, or are bound together in their own separate publication, the plurality of published forms create a publication.

The plurality of gift cards of each form and of each publication can include 2, 3, 4, 5, 6, 7, 8, 9, 10, 11, 12, 13, 14, 15, 16, 17, 18, 19, 20, 25, 30, or more non-activated gift cards. In one exemplary embodiment, the form can include eight non-activated gift cards. In another embodiment, the form may include only a single non-activated gift card. The plurality of gift cards can be arranged in rows, columns, or another arrangement on the sheet of material (e.g., paper) from which they are created, and may be separated from one another by cuttable lines of separation, tearable lines of separation, perforations, microperforations, die cut ticks, score lines, other suitable means of separation formed in or on the sheet of material between each of the plurality of gift cards, or a combination of any of the foregoing.

In some embodiments, the plurality of gift cards of the form can be pre-cut during manufacturing and may be attached to a plastic or wax-coated paper backing sheet from which each gift card may be peeled for activation and delivery from the gift giver to the gift recipient. In another embodiment, the plurality of gift cards of the form can be sealed beneath a plastic cover that can be peeled off and removed to reveal each, several, or all of the plurality of gift cards.

The form can be constructed so as to include multiple leafs that allow the form to be folded for easier insertion into the package envelope. In one embodiment, the form can be a two-sided bi-fold form having two leafs. The two leafs can be glued together. During manufacturing, a first side of the form can be printed with lithographic plates while a second side of the form can be printed by ink jet in single color or full color for variable printing of custom bar codes (including either or both linear bar codes and matrix bar codes, for example, QR codes), numbers, graphics, images, alphanumeric text, and symbols. However, in preferred embodiments, digital printing can be used to achieve the high-speed variable printing that is desirable for printing different referral codes (e.g., custom bar codes, QR codes, and/or numbers) as well as custom graphics, images, alphanumeric text, and symbols on different forms. By printing or imprinting a unique variable digital image such as, for example, a number, bar code, or QR code, on each one-sided gift card, the unique variable digital image acts as a referral code that can be used by merchant, retailer, service provider, manufacturer, and program administrator gift card, loyalty card, and incentive card programs and accounts. Throughout this specification, where reference to gift cards are made, the apparatuses, systems and methods of this invention may also be used with customer loyalty cards and programs and with customer incentive cards and programs.

Figure 6A:
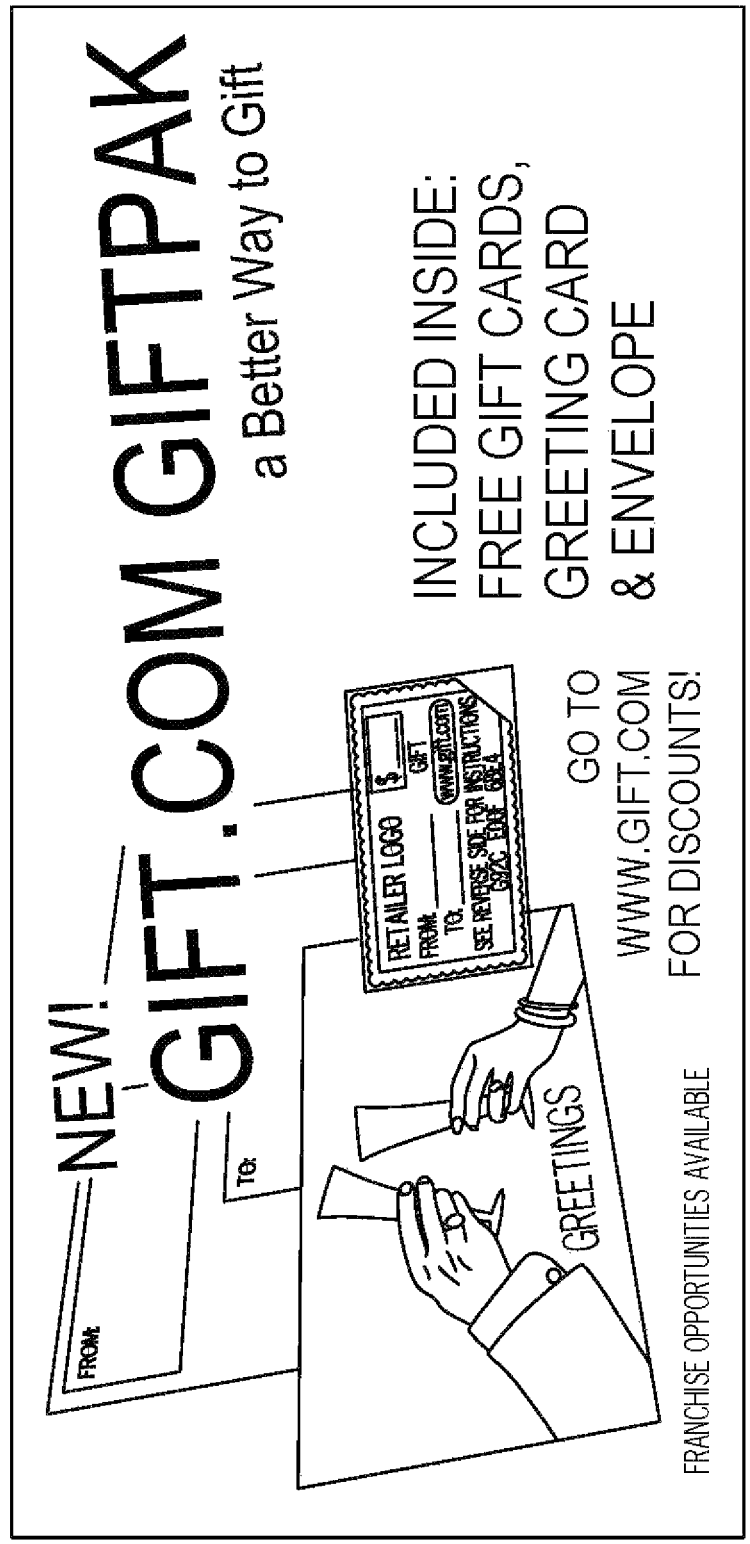
FIG. 6A is a top view of a package envelope into which the unitary single-sheet gift card and advertising form is insertable and sealable.
Figure 6B:
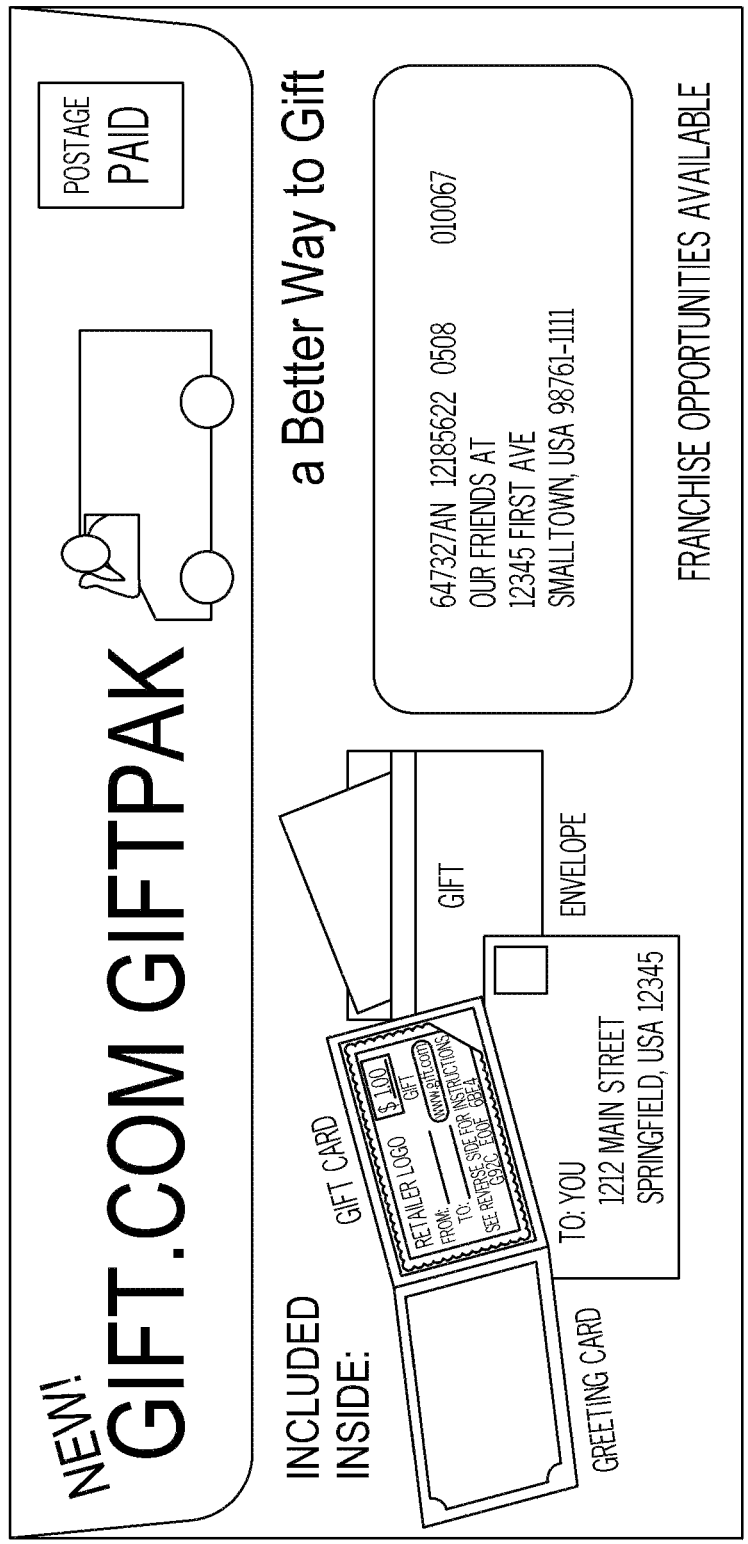
FIG. 6B is a bottom view of the package envelope of FIG. 6A.

One or more pieces of the form can feature printed information, which can be advertising. One or more of the forms are insertable into and sealable within the package envelope to create a publication package for delivery to the gift giver. One example of the package envelope is shown in FIGS. 6A and 6B. The activation system is used to activate at least one of the plurality of non-activated gift cards so as to create at least one activated gift card. The at least one activated gift card, and optionally the optional correspondence piece, are insertable into and sealable within the gift envelope to create a gift card package. The delivery system is used to deliver the gift card package from the gift giver to a gift recipient. The delivery system can be a postal system, courier service, retail distribution, or hand delivery. The redemption system can be used by the gift recipient to redeem the at least one activated gift card enclosed in the gift card package for a redemption item. The redemption item can be a product, a service, or money.

In one embodiment, one or more of the forms can be inserted as marriage mail into a billing envelope along with an invoice. For example, the form could be inserted into an envelope containing an invoice from a utility or cable television company. When the gift giver receives the company's invoice, the form with its plurality of non-activated gift cards are also included for the gift giver to activate and deliver to one or more gift recipients or to use personally as desired by the gift giver. In this embodiment, the system may omit the package envelope.

In another embodiment, one or of the forms can be inserted into or bound in a magazine or newspaper that is delivered to the gift giver. In this embodiment, the system may omit the package envelope.

Figure 7:
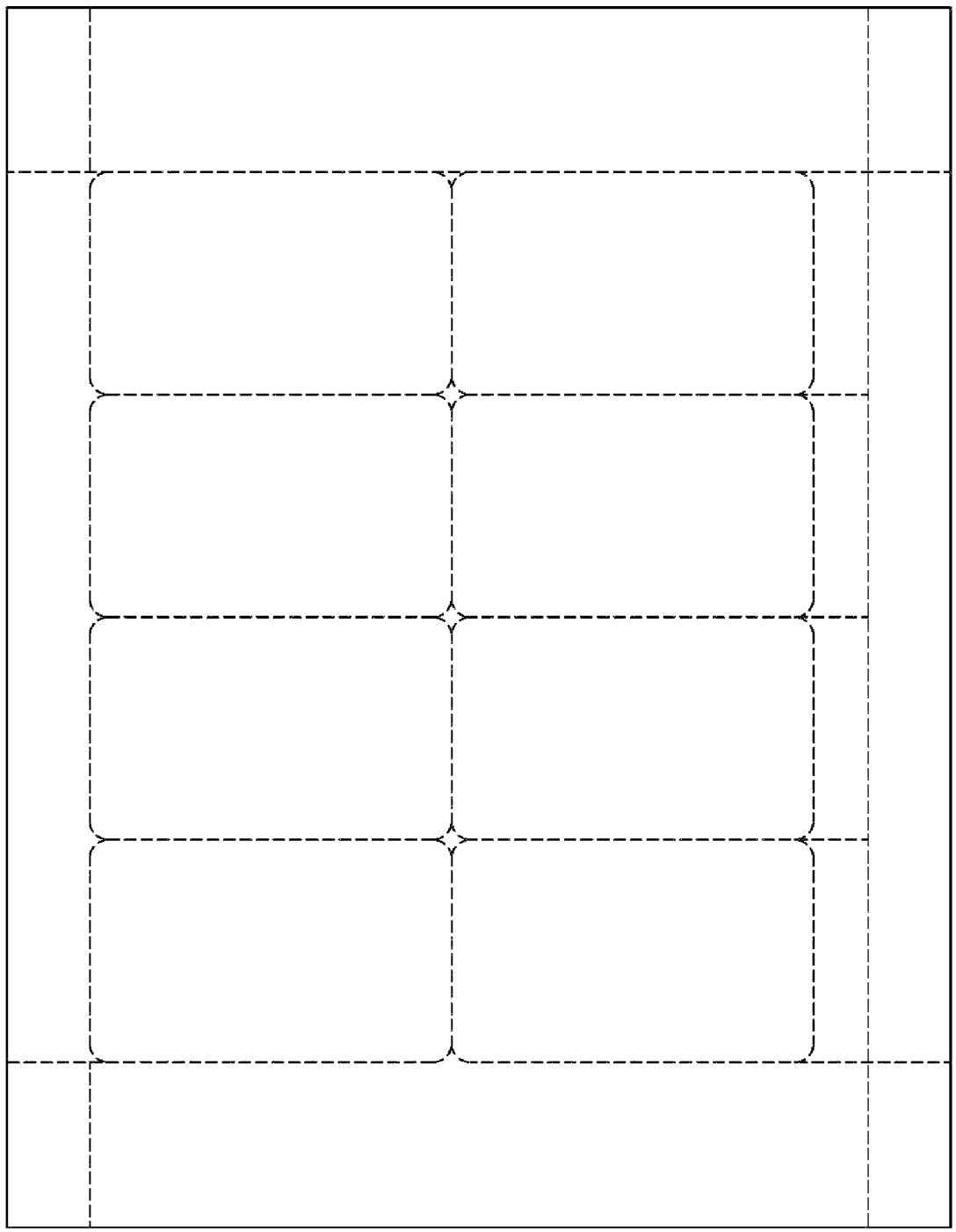
FIG. 7 is a top view of another embodiment of a unitary single-sheet gift card and advertising form. With the exception of the optional text shown printed thereon, a bottom view of this embodiment of the unitary single-sheet gift card and advertising form would be a mirror image of the top view, and therefore, is not shown in the drawings.
Figure 8A:
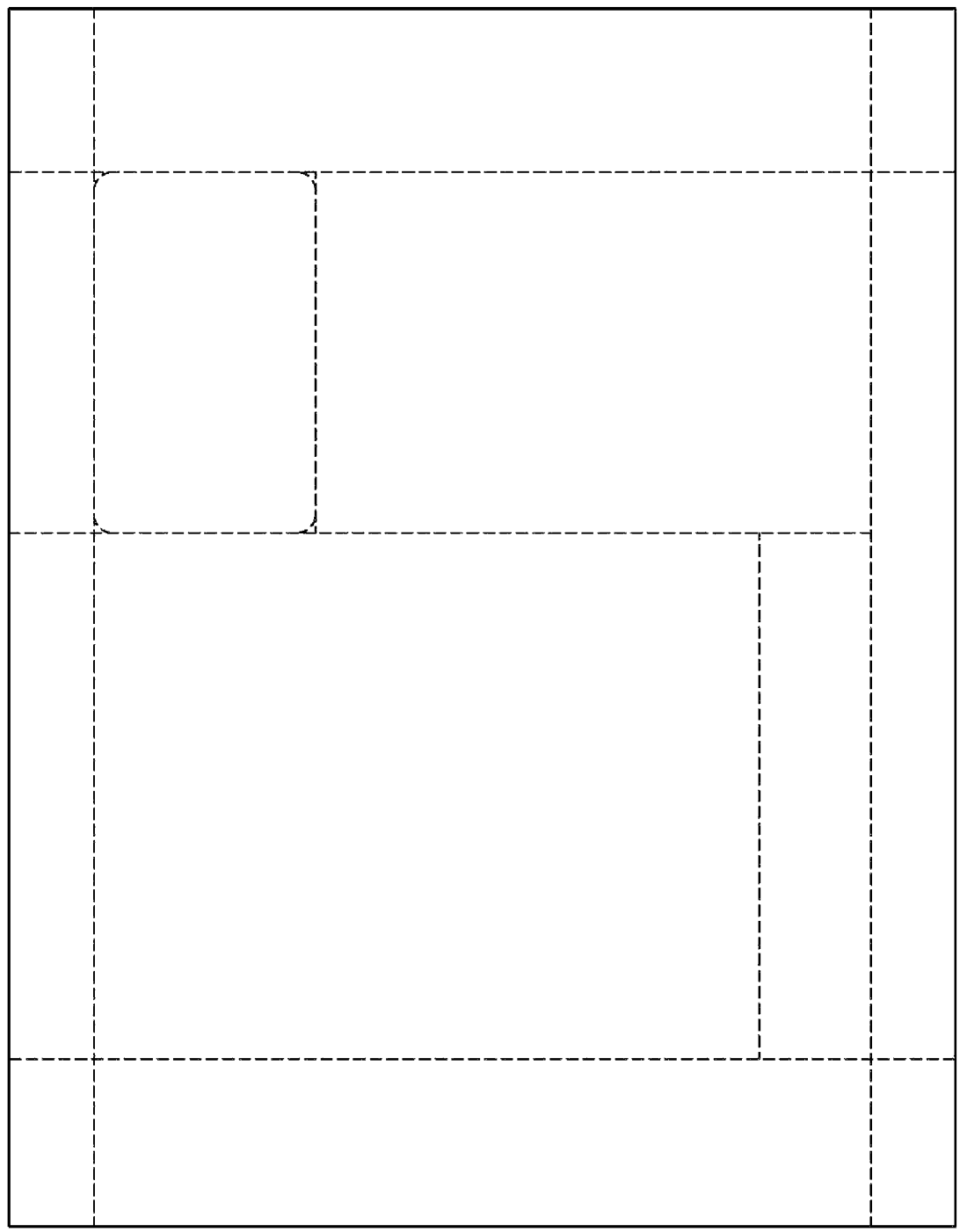
FIG. 8A is a top view of still another embodiment of a unitary single-sheet gift card and advertising form.
Figure 8B:
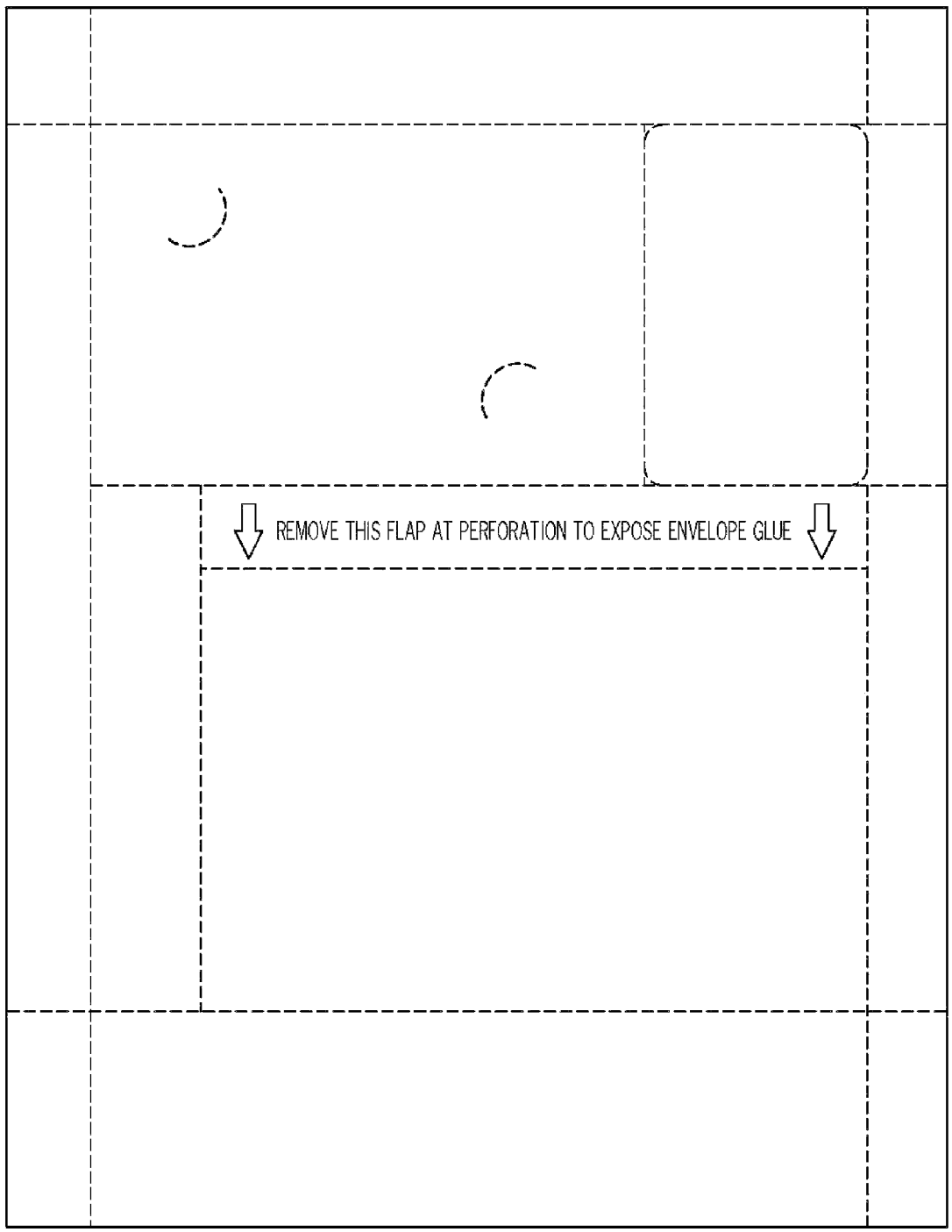
FIG. 8B is a bottom view of the unitary single-sheet gift card and advertising form of FIG. 8A with a detachable strip.
Figure 8C:
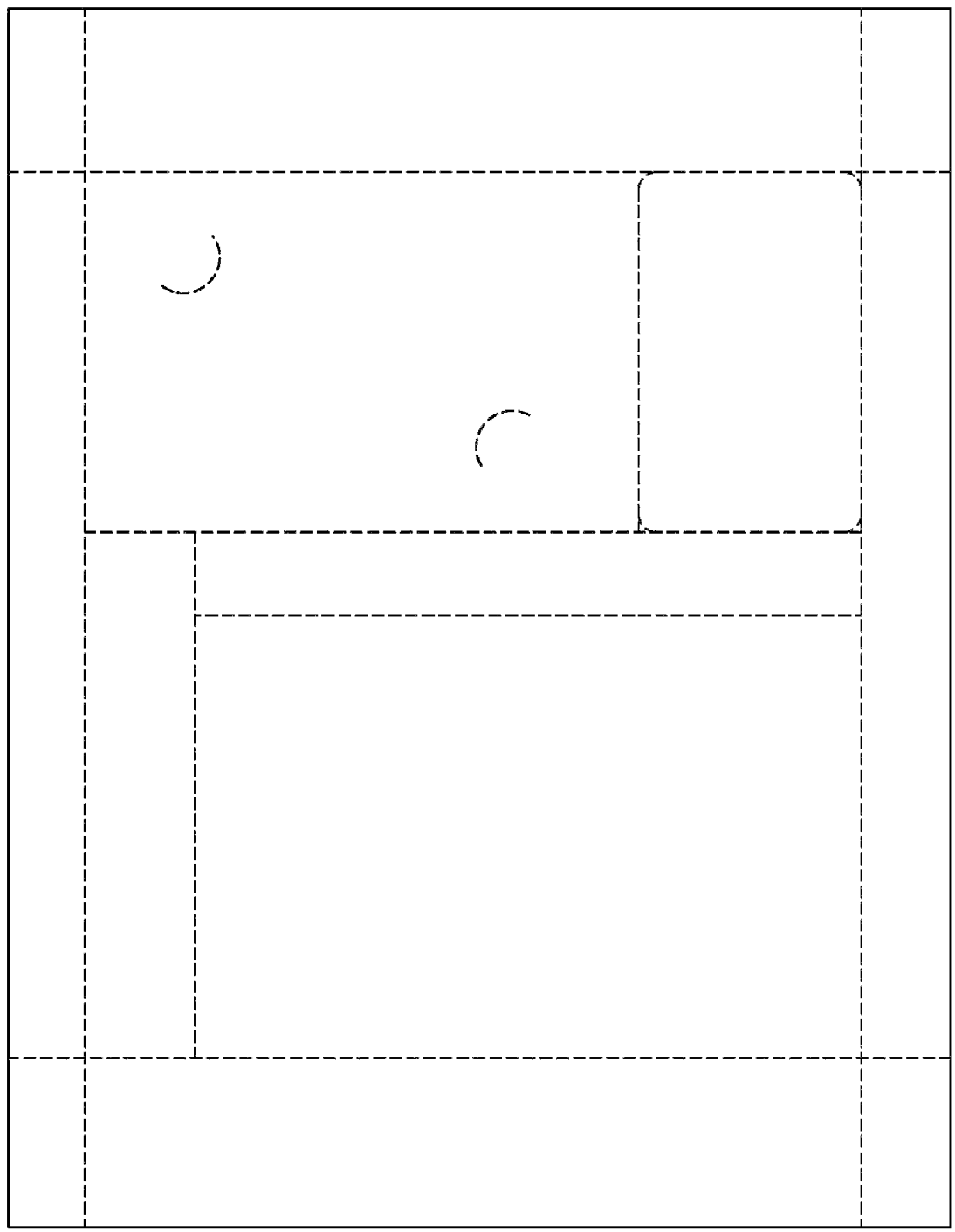
FIG. 8C is a bottom view of the unitary single-sheet gift card and advertising form of FIG. 8B with the detachable strip removed to reveal a slit of a gift envelope.

In an exemplary embodiment of the system, the form can feature two sheets of material (i.e., first and second sheets). The sheets may be combined to create a two-ply form. The form can be a self-mailer that includes address spaces for mailing direct to a consumer (i.e., to a gift giver) and for mailing the form by the gift giver directly to the gift recipient. The first and second sheets are printable and imprintable. As shown in FIGS. 8A-8C, the first sheet of this exemplary embodiment features a correspondence piece 83, a gift envelope 84 into which the correspondence piece can be inserted and mailed, and one or more optional pieces. The one or more optional pieces can be a single gift card 80, a buck slip, an instruction card, a transaction register, a photograph, an advertisement, or any other suitable item that is printable or imprintable. For purposes of enhancing the ability of the first sheet to be fed through a printing device, the first sheet can include one or more detachable frame elements 86 that may be removed and discarded after printing or imprinting, whichever step occurs last before mailing or delivery of the form to the gift recipient. The first sheet may also be constructed without frame elements. Detachable frame elements 86 may also be included in the sheet of FIG. 7.

In the exemplary embodiment described above, the second sheet can feature a plurality of non-activated gift cards arranged in columns or rows on the sheet and separated by any of the means of separation described herein. For purposes of enhancing the ability of the second sheet to be fed through a printing device, the second sheet can include one or more detachable frame elements that may be removed and discarded after printing or imprinting, whichever step occurs last before mailing or delivery of the form to the gift recipient. The second sheet may also be constructed without frame elements. Along with the correspondence piece, one or more of the gift cards may be detached from the first or second sheet, activated by the gift giver, and inserted into the gift envelope for delivery to the gift recipient.

The correspondence piece may be attached at a horizontal perforation so that the gift card form is foldable at the horizontal perforation. After all printing and imprinting is completed, the frame, if any, may be removed from around the gift envelope and the correspondence piece while those two pieces are left connected together at the horizontal perforation. One or more non-activated gift cards can be placed into a pocket of the gift envelope or inserted into the fold formed between the still-connected correspondence piece and gift envelope at the horizontal perforation. The gift card form may be distributed to the gift giver folded at the horizontal perforation around the article. In one embodiment, the article can be a sale receipt handed to the gift giver when the gift giver makes a purchase at a retail location, e.g., at a clothing store, a big-box retailer, a restaurant, or any other retail location.

The terms "print" and "printable" as used herein relate to printing on one or more of the plurality of separable pieces of the form and the package envelope during manufacturing, or printing on a surface of one of these components in a first instance by a manufacturer. The terms "imprint" and "imprintable" as used herein refer to printing on one or more of the plurality of separable pieces of the form and the package envelope by a user subsequent to manufacturing. Imprinting can be accomplished manually using a pen, pencil, or other handheld writing instrument, or mechanically using a printer or printing device. For example, the user may imprint customizations onto a blank correspondence piece in the first instance where the manufacturer has not printed any information on the correspondence piece of the form during manufacturing, or the user may imprint customizations in a second, third, fourth or other instance onto a form that includes information printed thereon by the manufacturer during manufacturing. By way of further example, a form that includes information printed thereon by the manufacturer during manufacturing is printed in the first instance, customizations subsequently printed onto the form by a user are imprinted in the second instance, and additional information thereafter printed onto the same form by the same user or by another user is imprinted in the third instance. Imprinting of the form can also be performed by the retailer.

The form forms a gift card mall that is deliverable directly to a gift giver or potential gift giver, for example, into a home, office, or other address of a gift giver or potential gift giver. For purposes of convenience, hereinafter, both gift givers and potential gift givers will be referred to as a gift giver. Like a conventional gift card mall display or kiosk found in a retail store, the "gift card mall in the home" of this system can provide a plurality of gift cards from different retailers or manufacturers from which the gift giver may select to activate and deliver to the gift recipient. The gift card mall of this system, however, provides the gift giver the ability to select a non-activated gift card for activation at the gift giver's home or office or from another location that is remote from a retail store. The gift giver can activate one or more of the non-activated gift cards for delivery to one or more gift recipients. Non-activated gift cards not initially activated by the gift giver can be saved for activation and delivery later to one or more gift recipients. The gift cards of the form can be for goods or services, incentive items, or customer loyalty points and rewards sold or provided by one or more retailers or manufacturers. In one embodiment, all of the gift cards in the form can be from a single retailer or manufacturer. In another embodiment, each of the gift cards in the form can be from a different retailer or manufacturer. In still another embodiment, the form can feature sets of two or more gift cards, wherein each set of gift cards is from a different retailer or manufacturer. In yet another embodiment, the gift cards of the form can be for money that can be used to purchase goods or services from a retailer, manufacturer, service provider, or other card issuer. In another embodiment, the gift cards of the form can be for specific goods or services from a retailer, manufacturer, service provider, or other card issuer. As used herein, the term retailer shall also include service providers in addition to retailers of goods and other merchants. The form's plurality of gift cards can be from local retailers, national retailers, or a mixture of both local and national retailers. Gift cards of the system that are issued by or are specific to manufacturers can be used at any store (brick-and-mortar, telephonic, or online) that sells the manufacturer's goods and agrees to accept the gift cards. In one embodiment, one or more of the plurality of gift cards can be co-branded with both retailer and manufacturer's names and advertising information.

In addition to serving as a system for gifting and distribution of gift cards to gift givers and incentives, the system also serves to distribute advertising from one or more advertisers. The one or more advertisers can be retailers, manufacturers, or other card issuers. Once activated by the gift giver, the activated gift card can be redeemed through the redemption system by the gift recipient. The redemption system may be operated by the card issuer, which can be a retailer, a manufacturer, or a system provider. The system provider can be a party, e.g., a company or individual, that operates the system by performing one or more of the functions of: creating the form and publication package; delivering the non-activated gift cards to the gift giver; providing online, telephonic, in-store, or other means for funding and activating the non-activated gift cards; and permitting redemption of the activated gift card by the gift recipient for the redemption item.

In one embodiment, the gift cards of the form can be closed loop cards in that the gift cards are redeemable for redemption items sold, distributed, or provided only by the retailer or manufacturer identified on each gift card. In another embodiment, the gift cards of the form can be open loop cards in that the gift cards are redeemable for redemption items sold, distributed, or provided by any retailer or manufacturer who has agreed to or is authorized to accept the gift cards for the purchase of goods or services.

In one embodiment of the system, the system provider may create a form featuring gift cards from a plurality of different retailers or manufacturers. In this example, a retailer and manufacturer may permit the system provider to allow the gift recipient to use the activated gift card received from the gift giver for the redemption of the redemption item from a different retailer or manufacturer. In another example, the retailer or manufacturer may restrict redemption of the gift card only for redemption items sold, distributed, or provided by that retailer or manufacturer. As a condition of using the system provider's service, the system provider may require that participating retailers, manufacturers, and other card issuers permit the redemption of an activated gift card for redemption items sold, distributed, or provided by other participating retailers, manufacturer, or other card issuers.

After activating and delivering one or more of the plurality of gift cards to one or more gift recipients, the remaining non-activated gift cards can be retained by the gift giver for future activation and delivery to the same one or more gift recipients or to one or more different gift recipients.

During manufacturing, the form can be formatted to maximize the number of forms that can be packaged for Flat Rate Standard Mail in accordance with the United States Postal Service ("USPS") Direct Mail Manual specifications and regulations for USPS Flat Rate Standard Mail. To comply with USPS regulations and specifications applicable to USPS Flat Rate Standard Mail, the publication package containing the plurality of forms can be a minimum of about 6 inches wide×5 inches long with about 0.125-inch radius rounded corners and the packaged forms can be no more than about 0.75 inches in thickness from any edge of the package. The publication package can be flexible so that the package is capable of bending one inch from any edge without affecting the contents inside the package. The publication package can also be a uniform thickness so that any bumps, protrusions, or other irregularities do not cause more than one-quarter of an inch in variance in the thickness of the package. These dimensions minimize the postage expense for mailing each publication package. The paper from which the forms are constructed may be almost any weight, but in exemplary embodiments, can be 50 lb. or 60 lb. base weight uncoated book paper or 20 lb. or 24 lb. base weight bond weight paper. Using the 24 lb. bond paper or the 60 lb. uncoated book paper, a plurality of forms, each including a single sheet, can be packaged within a single publication package for delivery or distribution to a consumer as USPS Flat Rate Standard Mail. If lighter weight papers such as the 20 lb. bond paper or the 50 lb. uncoated book paper are used, more than thirty forms may be packaged and shipped in a publication package to a consumer using USPS Flat Rate Standard Mail rates. The exact number of forms that can be inserted into the publication package is also dependent on whether the forms are single-ply, double-ply, multi-ply, or a combination of the foregoing.

In an exemplary embodiment, the system can further include an online gift card mall accessible via a computer connected to a telecommunications system. The computer can be a personal desktop computer, laptop computer, a server accessed directly or via a network, a tablet computer, a mobile device (e.g., a cellular phone, smart phone, personal digital assistant, tablet computer, or any other mobile device having a communicative connection to the telecommunications system), a smart television, or any other suitable computing device that can be connected to telecommunications system such as, for example, the Internet. The activation system and the redemption system are accessible via the online gift card mall so that activation of the at least one activated gift card and redemption of the at least one activated gift card for the redemption item can be performed online via the online gift card mall.

The online features of the system may also be accessed via computers that are mobile platforms such as software installed on or accessible from a cellular phone, smart phone, personal digital assistant, tablet computer, or any other mobile device having a communicative connection to the telecommunications system.

The invention also features a gift card and advertising form. The form can feature a unitary single-sheet form, which can include a plurality of separable pieces. The plurality of separable pieces can feature a plurality of non-activated gift cards, a gift envelope, and an optional correspondence piece. One or more pieces of the form can feature printed information, which can be advertising. The plurality of separable pieces can be removably connected to one another as components of the unitary single-sheet form at cuttable lines of separation, tearable lines of separation, perforations, die cut ticks, score lines, or a combination of any of the foregoing. In exemplary embodiments, the form is manufactured from paper. In other embodiments, the form can be manufactured from plastic.

In some embodiments, the gift card and advertising form can feature one or more optional pieces. In an exemplary embodiment, the correspondence piece can be an optional piece that is includes as a separable piece of the gift card and advertising form. Other possible optional pieces include, but are not limited to, a register for manually recording transactions made using the activated gift card, a photograph, a buck slip, an instruction piece having instructions for activating the gift card or using the system, an advertisement, a coupon, an informational piece, or any other suitable piece that can be printed or imprinted and form a separable piece of the gift card and advertising form.

Various embodiments of the gift card and advertising form can feature varying numbers of non-activated gift cards. For example, the embodiment shown in FIGS. 5A and 5B includes fourteen non-activated gift cards. In another example, the embodiment shown in FIG. 7 includes eight non-activated gift cards 80. In still another example, the embodiment shown in FIGS. 8A-8C includes a single non-activated gift card 80.

In one embodiment of the gift card and advertising form, each of the plurality of non-activated gift cards can be specific to a different retailer, selling goods or services for which one of the plurality of non-activated gift cards is redeemable. In another embodiment of the gift card and advertising form, each of the plurality of non-activated gift cards can be specific to a different manufacturer, providing goods or services for which one of the plurality of non-activated gift cards is redeemable. In yet another embodiment of the gift card and advertising form, each of the plurality of non-activated gift cards can be specific to a product or service that is different from the product or service related to any other gift card in the form.

In one embodiment of the gift card and advertising form, at least two of the plurality of non-activated gift cards can be specific to a single retailer, selling goods or services for which one of the plurality of non-activated gift cards is redeemable. In another embodiment of the gift card and advertising form, at least two of the plurality of non-activated gift cards can be specific to a single manufacturer, providing goods or services for which one of the plurality of non-activated gift cards is redeemable. In still another embodiment of the gift card and advertising form, at least two of the plurality of non-activated gift cards can be specific to a single product or service that is different from products or services related to any other non-activated gift cards in the form.

The gift card and advertising forms constitute a new form of media that permit retailers, manufacturers, advertisers, and system operators to distribute not only gift cards but other printed media as well, e.g., customer loyalty cards, customer incentive cards, direct mail, advertising, informational materials, instructions, and entertainment-related materials such as commercial games associated with advertising-supported rewards point systems that may be used by a consumer to earn and redeem points for goods, services, or money. This new form of media may also be used with and include one or more websites operated in conjunction with the distribution of the forms, which present entertainment-related materials, e.g., images, text, videos, animations, or commercial games. The published forms can be interconnected with the website or websites so that the forms drive traffic to the one or more websites so that users (e.g., consumers who are gift givers or gift recipients) to view and listen to interactive media presentations related to products and services. The one or more websites may also be used by the gift recipient to send a thank you note to the gift giver to express the gift recipient's gratitude for the gift card and its associated gift giver-selected or gift recipient-selected redemption item. In this way, the exchange of information is bi-directional using the forms and associated websites for communications between the gift giver and gift recipient and between the gift giver or gift recipient and the retailer in the form of actual correspondence as well as reviews and data compiling related to the retailer's goods or services.

FIG. 8A shows an exemplary embodiment of the unitary single-sheet gift card and advertising form. In the exemplary embodiment, the form can include two connected plies. In other embodiments, the form can be created from a single ply or from three, four, five, or more plies (or sheets) of material. The two connected plies can include a first ply forming a front side of the form and a second ply forming a rear side of the form. The gift envelope of the form can include a perforation and a slit that are present on the second ply and together create a detachable strip that covers a glue area of a lid of the gift envelope 84. The slit forms an opening into a pocket of the gift envelope into which one or more of the plurality of gift cards, correspondence piece, or other separable components may be inserted for delivery to the gift recipient. As shown in FIGS. 8B and 8C, the detachable strip conceals the slit in addition to the glue area.

As shown in FIGS. 8B and 8C, the detachable strip 85, perforation, and slit are located on the glue-side (featuring an adhesive strip or glue area) of a lid of the envelope. The slit is cut along a bottom edge of the detachable strip so that the detachable strip 85 is separated from a top portion of a pocket side of the gift envelope. (Before the slit is cut, the detachable strip forms a part of the pocket side of the gift envelope from which it is separated once the cut is made to create the slit.) The perforation is formed along a top edge of the detachable strip 85 so that the detachable strip 85 is removable from its position over the glue area of the gift envelope's lid. The detachable strip 85 can be removed by tearing the perforation when the gift envelope 84 is detached from the form. The glue area can be uncovered once the detachable strip 85 is removed so that the glue area of the lid is capable of being used to seal the gift envelope 84. Once the detachable strip 85 is removed from the glue area, the glue area is uncovered so that the glue area can be used to seal the lid of the gift envelope 84 thereby securely enclosing the inserted contents inside, and the detachable strip may be discarded. The detachable strip may include printed or imprinted instructions for its removal.

Figure 9:
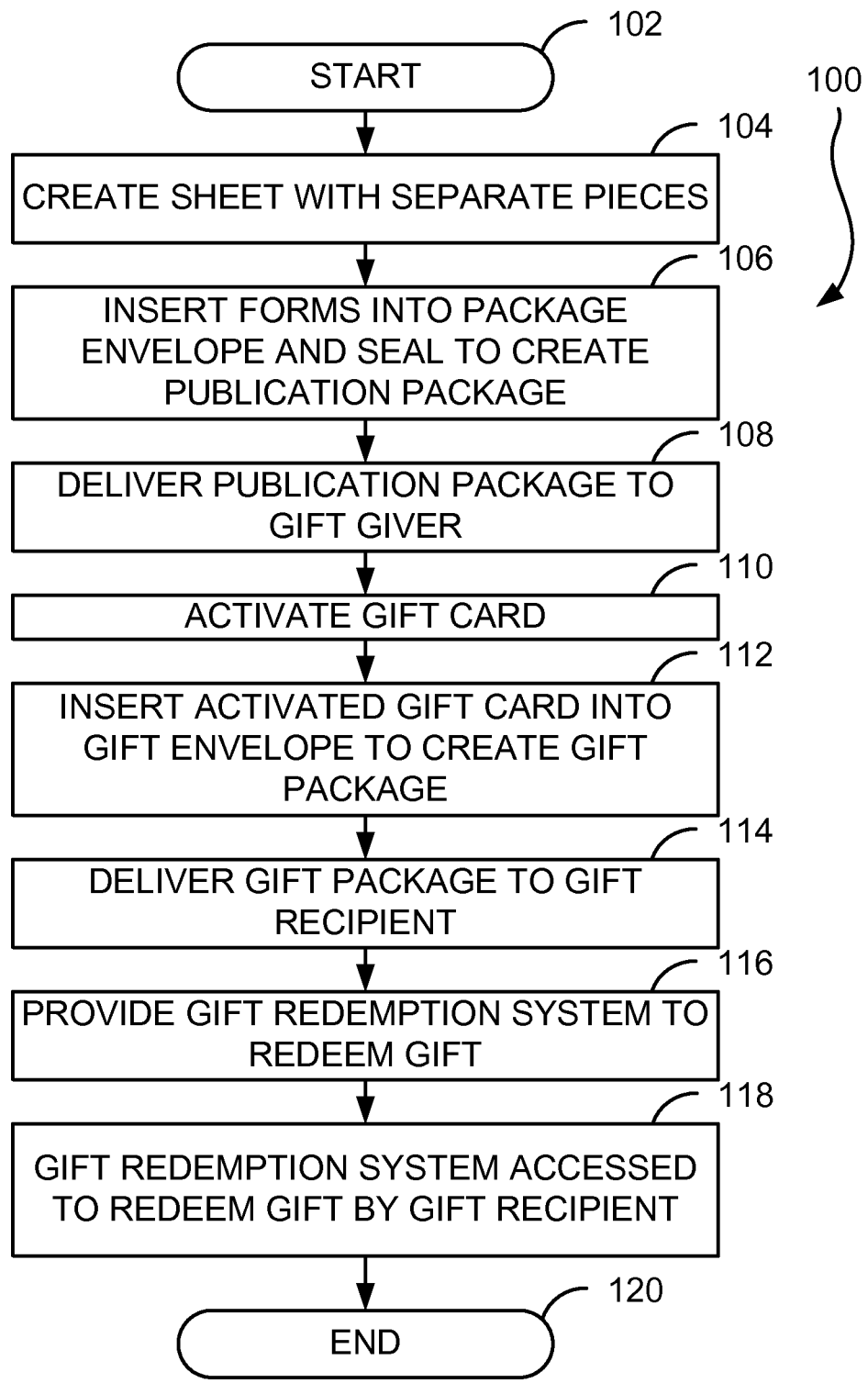
FIGS. 9-11 are flowcharts illustrating methods of distributing and using the gift cards, according to various embodiments of the present invention.

The invention also pertains to a method for distributing gift cards and advertising, which will now be discussed along with flowchart 100 of FIG. 9. In one step of the method, starting at Block 102, a unitary single-sheet form featuring a plurality of separable pieces is created (Block 104). The plurality of separable pieces can feature a plurality of non-activated gift cards, a gift envelope, and an optional correspondence piece. One or more pieces of the form can include printed information, and the printed information can include advertising. In another step of the method, one or more of the forms can be inserted and sealed into a package envelope to create a publication package (Block 106). In a next step of the method, the publication package can be delivered to a gift giver (Block 108). Using an activation system, in a next step of the method, at least one of the plurality of non-activated gift cards can be activated so as to create at least one activated gift card (Block 110). In a next step of the method, the at least one activated gift card, and optionally the optional correspondence piece, can be inserted and sealed into the gift envelope to create a gift card package (Block 112). In a next step of the method, the gift card package can be delivered to a gift recipient selected by the gift giver (Block 114). Finally, a redemption system can be provided whereby the gift recipient can redeem the at least one activated gift card enclosed in the gift card package (Block 116).

In another step of the method, the activation system and the redemption system can be accessible via a computer connected to a telecommunications system so that activation of the at least one activated gift card and redemption of the at least one activated gift card for a redemption item are performable online via the online gift card mall (Block 118). The operation may then terminate at Block 120.

Figure 10:
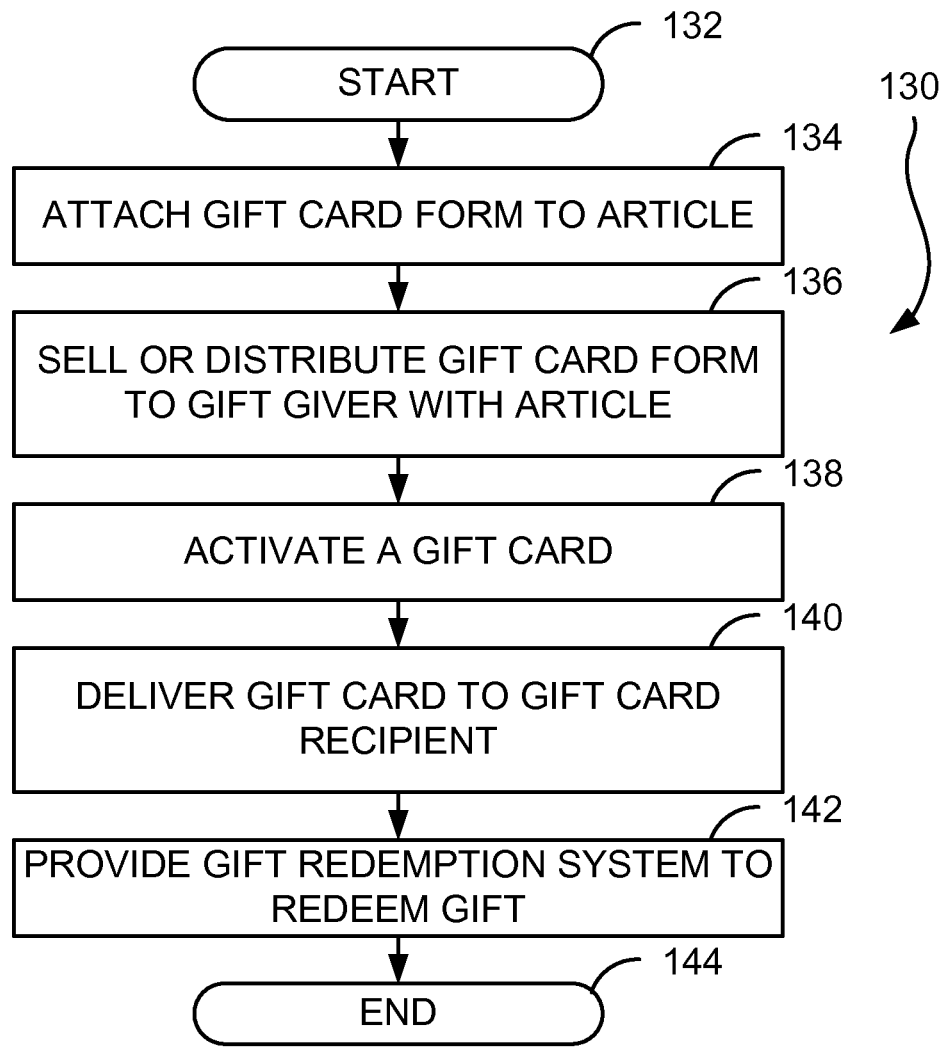

The invention can also feature a method for distributing gift cards and advertising, which will now be discussed along with flowchart 130 of FIG. 10. In one step of the method, starting at Block 132, a gift card form can be attached to an article that is different from the gift card form's own packaging (Block 134). The article can be, for example, a product sold or distributed in commerce, product packaging of a product sold or distributed in commerce, a shopping bag, a door hanger, a newspaper or other publication, or a direct mail advertisement. The gift card form can feature at least one unitary single-sheet form featuring a plurality of separable pieces. The plurality of separable pieces can include a plurality of non-activated gift cards, a gift envelope, and an optional correspondence piece. One or more pieces of the form can feature printed information and wherein the printed information features advertising. In a next step of the method, the article can be sold and distributed to a gift giver with the gift card form being provided simultaneously therewith so as to deliver the gift card form to the gift giver with the article that was sold or distributed to the gift giver (Block 136). In a next step of the method, using an activation system, at least one of the plurality of non-activated gift cards can be activated so as to create at least one activated gift card. In a next step of the method, the at least one activated gift card, and optionally the optional correspondence piece, can be inserted and sealed into the gift envelope to create a gift card package (Block 138). In a next step of the method, the gift card package can be delivered to a gift recipient selected by the gift giver (Block 140). Finally, a redemption system can be provided whereby the gift recipient can redeem the at least one activated gift card enclosed in the gift card package (Block 142). The operation may then terminate at Block 144.

In this method, the delivery step of the method can further include the step of delivering the gift card package to the gift recipient with a second gift card form to perpetuate a buying chain, wherein the buying chain is perpetuated when the gift recipient becomes a second gift giver by activating at least one of a plurality of non-activated gift cards of the second gift card form and delivers the at least one activated gift card of the second gift card form to a second gift recipient. The sale or distribution step of the method can further include the step of allowing a consumer to buy the article at a retail store. The sale or distribution step of the method can also further include the step of allowing the gift recipient to purchase the article via telephone and delivering the article to a home of the gift recipient. The sale or distribution step of the method can also further include the step of allowing the gift recipient to buy the article via a telecommunications network and delivering the article to a home of the gift recipient.

In this method, the article can be sold to the gift recipient at a specific point of purchase. The specific point of purchase can be a store. The store can be a brick-and-mortar retail store or an online virtual store that is accessible via a telecommunications network.

The activation step of the method can be performed by the gift giver. In this method, the activation step can be performed at a location remote from the store. In one embodiment, the activation step of the method can include the step of having the gift giver allocate a dollar value to the activated gift card by transferring funds to a gift card account associated with the specific activated gift card that is activated by the gift giver.

Using the method, in one embodiment, at least one of the optional correspondence piece and the envelope can be personalized for a specific occasion. In another embodiment, at least one of the optional correspondence piece and the envelope can be personalized for a non-specific occasion. The advertising can be personalized advertising selected based on data available to an advertiser creating the advertising concerning the gift giver's specific demographics and interests. Other personalized information can be printed or imprinted on at least one of the optional correspondence piece and the envelope including the gift giver's name and address or other contact information, the gift recipient's name and address or other contact information, a personalized message from the gift giver to the gift recipient, other alphanumeric text, images, graphics, or symbols.

In this method, the redemption system can be located at a brick-and-mortar retail store so that the at least one activated gift card is redeemable at the retail store. The redemption system can be an online retail store accessible remotely via a telecommunications network so that the at least one activated gift card is redeemable remotely via the online retail store.

Figure 11:
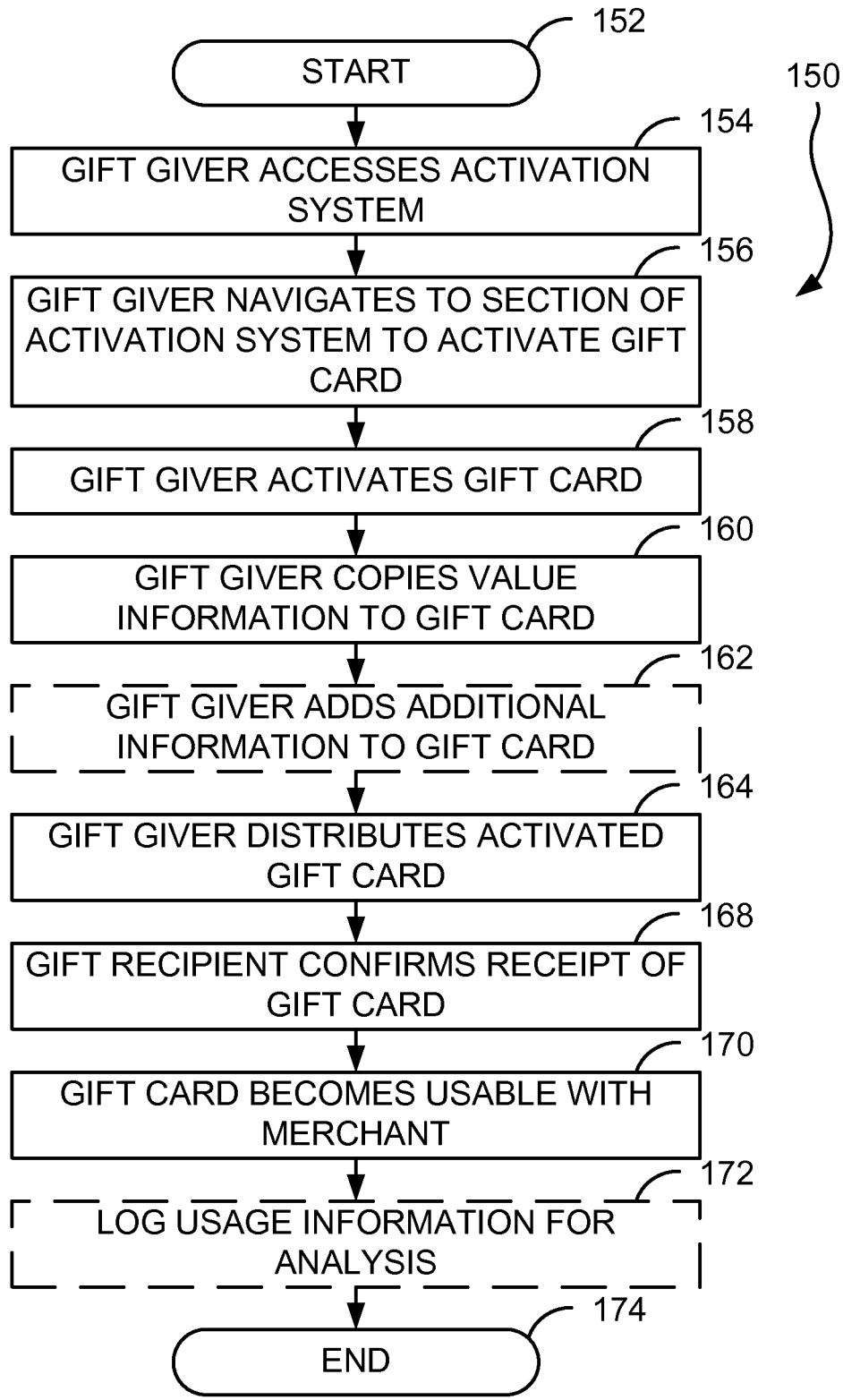

In certain embodiments of the method, the method can use a gift card form that includes the gift envelope being attached at a horizontal perforation to the at least one non-activated gift card and the one or more optional pieces, which will now be discussed along with flowchart 150 of FIG. 11. The gift card form can be foldable at the horizontal perforation. The gift card form can be handed or otherwise delivered to the gift giver folded at the horizontal perforation around the article, and the article can be a receipt handed to the gift giver when the gift giver makes a purchase at a retail location.

In one example, the method may begin at Block 152, wherein a gift giver of the gift card may access an activation system (Block 154). The activation system may be presented via a webpage or other communication interface. The location of the activation system may be provided by the gift card form, which may be included a specific part, or a sub-section, and/or a specific page of the printed gift card form. The gift giver may then access a webpage and/or microsite page of the activation system for the purpose of activation and/or adding value to one or more gift cards included on the gift card form (Block 156).

The gift giver may then activate the gift card using the activation system (Block 158). Activating the gift card may include transferring a value to be associated with one or more gift card included on the gift card form. The gift giver may then be instructed to copy or write the value and other information on the gift cards of the printed form that have been activated and supplied with a value (Block 160). The gift giver may also optionally include additional information on other parts of the gift card form, for example, a greeting card or envelope (Block 162).

The gift giver may then be instructed by the activation system to distribute one or more of the gift cards on the printed gift card form, which may have been activated, to a gift recipient (Block 164). Skilled artisans will appreciate that the gift giver can also be the gift recipient in some instances. For example, the gift giver may retain a gift card to be used by the gift giver at a later time. In the interest of clarity, throughout the rest of this example, the gift recipient will be presumed to be a separate person than the gift giver, without imposing any limitation on the present invention.

The gift recipient may be instructed to access a redemption system and confirm receipt of the gift card (Block 166). The redemption system and the activation system may be separate systems or the same system. Alternatively, the redemption system and activation system may be separate but related microsite pages of the same system or webpage. Instructions for confirming receipt of the gift card may be included on the gift card, as part of the gift card form and/or gift card package, or be otherwise communicated to the gift recipient.

Upon confirmation that the gift card has been received by the gift recipient, the gift card may be enabled to be used with a merchant (Block 168). More specifically, an activated and confirmed gift card may be used to transfer at least part of the value included by the gift card to one or more merchant. The transfer of value from the gift recipient to the merchant may be made at a brick-and-mortar or virtual online retail store (Block 170).

As an added benefit, the interactions of the gift giver, gift recipient, and/or merchant with the activation and/or redemption systems may optionally be monitored. A log may be created to record the interactions of each user. The log may be accessible by accessing the system, for example, via the internet. The collected information may be processed, for example by a computerized system, to generate receipts and/or reports of activities accomplished by any of the users (Block 172). The operation may then terminate at Block 174.

Figure 12:
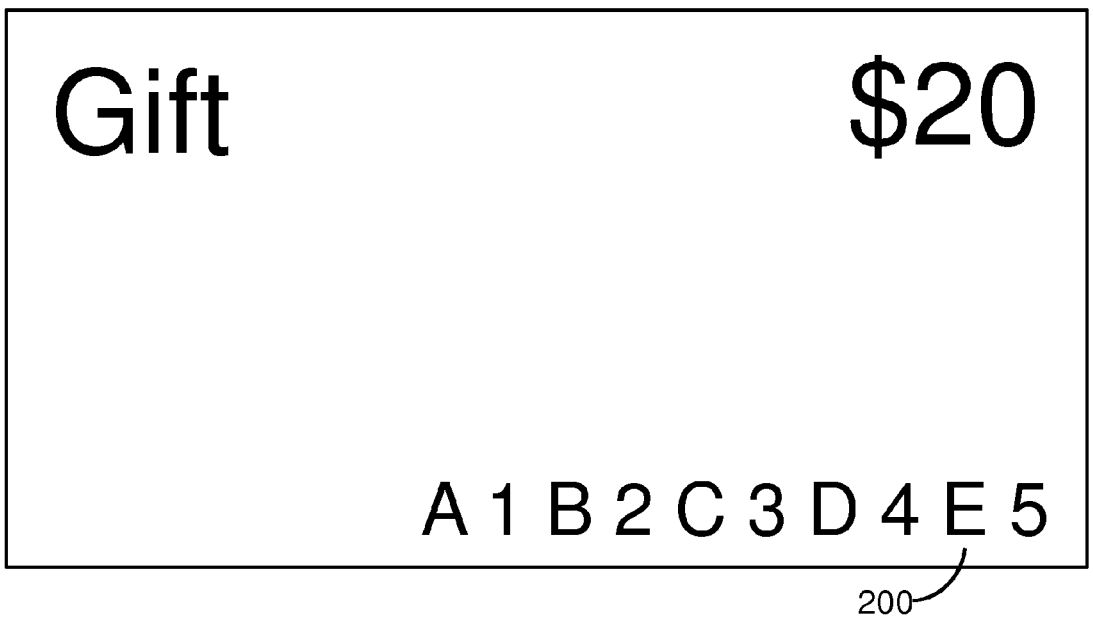
FIG. 12 is a diagram of an illustrative gift card with an identifier of the numbering system, according to an embodiment of the present invention.

Referring now additionally to FIG. 12, the present invention will be discussed as it relates to a one-sided gift card and a numbering system. The one-sided gift card includes front and rear sides. All information required for the card to be usable for making purchases of goods or services from merchants is printed or imprinted on the front side of the card. For example, an identifier 200 may be included on the gift card. The identifier 200 may include, for example, a gift card number or a reference number that is convertible to a virtual account number during activation. The identifier 200 may be printed or imprinted on the front side of the one-sided gift card. Other information that may be necessary to make the card capable of use in purchase transactions can also be printed or imprinted on the front side of the card. Such information can include one or more of the following: the name of the merchant at whose locations the card may be used in the case of closed loop cards, a network logo (e.g., Visa, MasterCard, American Express, or Discover) in the case of open loop cards, the funded value of the card, the name of the card holder, or any other information that is necessary or desirable to permit the card's use for making purchases. The front side of the one-sided gift card may also include a magnetic strip, a chip, or a bar code of any type (including, for example, a QR code) that encodes one or more of the aforementioned items of information that is necessary or desirable to enable the card to be funded by a gift giver and used by a gift recipient to make purchases.

The one-sided gift card may be constructed from any suitable material such as, for example, paper or plastic, and may be single-ply or multi-ply. The one-sided gift card may be created as a single unitary piece. In another embodiment, the one-sided gift card can be one detachable component of a printable and/or imprintable form that includes other detachable components in addition to the card. In still another embodiment, the one-sided gift card can be included on a page of a multi-page publication, e.g., a magazine, a newspaper, or a booklet containing a plurality of gift cards. The one-sided gift card can also be embedded in an advertisement that appears in a publication.

The one-sided gift card may include a unique identifier 200. The unique identifier can be a gift card account number. In another embodiment, the unique identifier can be a reference number that can be re-used multiple times by the merchant and gift giver. The gift giver may be a user. For example, a gift giver who receives a publication such as a "gift card mall in the home" publication that contains a plurality of gift cards that are associated with a plurality of merchants may wish to fund and activate more than one gift card from a merchant including one of its cards in the publication.

When the gift giver enters the reference number imprinted on the merchant's card within the publication into an interface, such as the online and/or telephonic activating and funding system, the system can then generate a virtual gift card account number that is different from the reference number to permit the gift giver to send a virtual and/or physical gift card to a gift recipient. The virtual and/or physical gift card can be used to make purchases from the merchant. The reference number, however, can be re-used on subsequent occasions to fund, activate, and deliver additional virtual and/or physical gift cards to the same or one or more different gift recipients. The merchant's activation and funding system will also recognize the reference number, when it is re-used, as one previously associated with the gift giver and the particular publication in which the card appeared.

In an exemplary embodiment of the gift card system, a hexadecimal numbering system may be used to identify the gift card and associate a value. The gift card can include the unique card identifier. The unique card identifier may be a unique account or identification number (e.g., a series of alphanumeric characters such as a series of sixteen numbers), a unique bar code encoding a unique account or identification number, a chip storing and encoding a unique account or identification number, and/or another unique identifier that associates the gift card with an account of the user into which monetary funds have been deposited. The unique card identifier can also be associated with the user and the user's personal information. In one embodiment, the bar code can be a QR code.

In an exemplary embodiment, the unique card identifier can be a hexadecimal number, also known as a hexadecimal digit or hex number. The hexadecimal digit may be standard in that it may be represented by a combination of the numbers 0-9 and the letters A-F. The hexadecimal number may include a check digit that can be used to detect errors in the input of the hexadecimal digit, for example, where one digit of the hexadecimal number is mistyped.

The hexadecimal number can be used to identify the gift card, its original distribution method (e.g., direct mail or insertion into a publication), and the original recipient (i.e., the gift giver). The hexadecimal number can also be used by the gift giver to perform a first activation in which the gift card is activated and funded by the gift giver. The gift card can then be delivered to the gift recipient in a gift card package. If the gift giver is a new user, the website may prompt the gift giver to register to create a new account before permitting the gift giver to activate and fund the gift card.

Upon receipt of the gift card package, the gift recipient can access the system website and submit the same hexadecimal number to perform a second activation of the gift card that confirms receipt of the gift card by the correct intended recipient. During this second activation, the website may also provide the recipient with an option to send a printed or electronic "thank you" message to the gift giver.

In an exemplary embodiment, the hexadecimal number can be used in connection with internet-based transactions and gift redemptions conducted through the system website. In another embodiment of the system, the hexadecimal number can be submitted through the website and converted by software to a printable document that can be used by the gift recipient at a brick-and-mortar retail location having a POS system. Once printed, the printable document, i.e., the printed gift card, can include a bar code (e.g., a linear, or one-dimensional, bar code of any of the numerous symbology formats, or a matrix, or 2D, bar code of any type including, for example, any of the following matrix bar code types: QR code, Aztec code, Data Matrix code, High Capacity Color Barcode, and PDF417) in which a standard sixteen-digit gift card number is encoded that will be accepted by a POS terminal. In another embodiment, the printed gift card can include the printed standard gift card number and no bar code. The hexadecimal number can also be used by system software to identify the user accessing the website so as to customize the website based upon data available that is related to the specific user.

The hexadecimal number may be printed or otherwise notated on or in a source such as, for example, the gift card, which can be either a physical card, e.g., a gift card constructed from paper or plastic, or a virtual gift card or "e-gift card." Hexadecimal numbers may also be printed on or in any of numerous other sources including, without limitation, catalogs, newspaper advertisements, catalog and newspaper inserts, brochures, magazines, conventional greeting cards, and virtual greeting cards or "e-greeting cards."

Each hexadecimal number can be unique and may be used as a primary identification ("primary ID") for one or more items of information. For example, the primary ID can be a name, address, e-mail address, telephone number, facsimile number, publication name, publication issue date, publication volume, card issuer name, account number, or any other item of information that identifies a person, entity, or publication. Publications may include, for example, brochures, catalogs, magazines, newspapers, and advertising inserts.

Each hexadecimal number may be used as an account identifier, which may associate one or more commercial transactions with a user. Additionally, each hexadecimal number may also be used as a reference identifier, which may facilitate the creation of an account by a user. For example, a user may enter a reference number into an interface to create a virtual account number. The same reference number may be used subsequently to establish additional accounts, each associable with additional account numbers, to fund one or more additional gift card.

Each hexadecimal number can also be used as a secondary identification ("secondary ID") for one or more items of information. For example, the secondary ID can be the name of a publisher or retailer, an effective date, an in-house date, a publication date, a date of transaction, a source of a mail list, a recipient's name, a recipient's address, a recipient's e-mail address, a specific product, a gift giver's name, a gift giver's address, a gift giver's e-mail address, a type of transaction, or other information that can be used to identify the gift giver, the recipient, the publisher, or the retailer.

In an exemplary embodiment, the source can be an e-gift card that may feature the name and address of a direct mail recipient of the e-gift card as the primary ID. The secondary ID can be one or more of the publisher, the retailer, the specific product, the publication date of the publication, the date of the transaction, and the type of transaction.

In another embodiment, the source can be a virtual greeting card that may feature the recipient's e-mail address as the primary ID. The secondary ID can be one or more of the gift giver's e-mail address, specific product, publisher, retailer, date of transaction, and the type of transaction.

In another embodiment, the source can be a catalog such as, for example, a store catalog. The primary ID can be the name and address of the catalog recipient. The secondary ID can be one or more of the catalog publisher, retailer, in-house date, effective dates, the source of the mail list, specific product in the catalog, and recipient's e-mail address.

In another embodiment, the source can be a newspaper insert that may feature the issue date and publication volume as the primary ID. The secondary ID can be a specific product.

In another embodiment, the source can be a newspaper advertisement that may feature the issue date and publication volume as the primary ID. The secondary ID can be a specific product.

In another embodiment, the source can be a brochure and the primary ID can include the publication issue date and publication volume. The secondary ID can be one or more of a specific product, the publisher, the retailer of a specific product, the publication date, the effective date, the name and address of the brochure's recipient, and the recipient's e-mail address.

In still another embodiment, the source can be a magazine and the primary ID can be the magazine recipient's name and address. The secondary ID can be one or more of the magazine publisher, the in-house date, effective date, the source of the mail list, a specific product, and the recipient's e-mail address.

In yet another embodiment, the source can be a conventional gift card or conventional greeting card. The primary ID can be the card issuer and an account number. The secondary ID can be one or more of the recipient's e-mail address, a specific product, the date of transaction, and the type of transaction.

The hexadecimal number can be used in conjunction with one or more computer databases to track the purchasing habits of consumers including both gift givers and recipients. The information obtained by the retailer, publisher, or advertiser using the tracking features can be used for predictive advertising in which related products are suggested to the gift giver or to the recipient after a first product is purchased. For example, the system may use data related to a gift giver's purchase of a birthday gift for a recipient during the previous year to recommend products or services for purchase by the gift giver for the recipient's birthday during the current year. In one embodiment, the hexadecimal number can be used in connection with social networking websites such as, for example, Facebook™ or MySpace™, to obtain information and data pertaining to the users of the social networking website. The data and information obtained may relate to advertisements viewed within the social networking website by its users. This user data and information can be compiled in a computer database and linked to products or services that can be displayed in advertising targeted to and customized for specific individuals or groups of individuals.

In another embodiment, the unique identifier can be a stock keeping unit (SKU) where each product is assigned a separate and unique SKU. The SKU can be a universal SKU system that may be used to identify products by multiple retailers or manufacturers rather than a conventional SKU that uses digits assigned by each retailer or manufacturer using its own numbering system. The hexadecimal number can be used in place of the SKU or in combination with the SKU.

In one embodiment, a hexadecimal number appearing in a catalog or other publication, once entered into the system by the user using the system website, can be used by the system to identify the user and the publication, for example, where the publication is a subscription sent regularly to the user. The catalog can further include unique SKU's each of which identifies a unique retail item or service or gift item displayed in the catalog. The user can select a gift item or retail item or service for purchase by entering the item's associated SKU into the UI of the website. The system then directs the user to a web page of the website that provides information about the selected item as well as purchasing options.

The hexadecimal number associated with a gift item appearing in a publication can be entered into the website's UI by the user, which is then identified by the system and matched with the location or IP address of a specific web page on the retailer or card issuer's website that can display an image of the gift item and a description of the gift item. The system associates the hexadecimal number with the user so that the system can track, among other data, the user's history concerning publications read by the user, products viewed on the system website by the user, and products purchased through the system website by the user.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A numbering and tracking system comprising:
an identifier comprising hexadecimal, vigesimal, quadrivigesimal, or any other alphanumeric characters includable on a card, wherein the card comprises a gift card, a customer loyalty card, or a customer incentive card;
an account identifiable using the identifier;
an interface connected to a communications network, the interface being accessible to associate the identifier with an account and manage funds associable with the account;
a remote server connected to the communications network;
funds data associable with the account and storable on the remote server, the funds data relating to the funds transferred by a user to a card issuer; and
an electronically readable format includable by the gift card to store the identifier;
wherein the identifier comprises a reference number that identifies an offer to create the account that is identifiable using the identifier, wherein the reference number is associable with information relating to the account, and wherein the account is associable with an account number upon creation;
wherein the identifier is included on the card via printing, imprinting, or both printing and imprinting;
wherein the identifier is readable from the electronically readable format using a computerized device with a processor and memory.

2. The system of claim 1, wherein the user comprises a gift giver.

3. The system of claim 1, wherein the reference number is usable to open a plurality of accounts, wherein each of the plurality of accounts is associable with a corresponding account number.

4. The system of claim 1, wherein the reference number is includable in an advertisement to solicit creation of the account, and wherein the advertisement is includable in a publication.

5. The system of claim 1, wherein the account is observable to track purchasing habits.

6. The system of claim 1, wherein the electronically readable format comprises at least one format selected from the group consisting of: a QR code, a magnetic strip, a bar code, and a memory storage chip.

7. A numbering system comprising:
an identifier includable on a card, wherein the card comprises a gift card, a customer loyalty card, or a customer incentive card;
an account identifiable using the identifier;
an interface connected to a communications network, the interface being accessible to associate the identifier with an account and manage funds associable with the account;
a remote server connected to the communications network; and
funds data associable with the account and storable on the remote server, the funds data relating to the funds transferred by a user to a card issuer;
wherein the account is observable to track purchasing habits;
wherein the identifier comprises a reference number that identifies an offer to create the account that is identifiable using the identifier, wherein the reference number is associable with information relating to the account, and wherein the account is associable with an account number upon creation.

8. The system of claim 7, wherein the identifier comprises hexadecimal, vigesimal, quadrivigesimal, or any other alphanumeric characters.

9. The system of claim 7, wherein the identifier is included on the card via printing, imprinting, or both printing and imprinting.

10. The system of claim 7, wherein the reference number is usable to open a plurality of accounts, wherein each of the plurality of accounts is associable with a corresponding account number.

11. The system of claim 7, wherein the reference number is includable in an advertisement to solicit creation of the account, and wherein the advertisement is includable in a publication.

12. The system of claim 7, further comprising an electronically readable format to store the identifier, wherein the identifier is readable from the electronically readable format using a computerized device with a processor and memory.

13. The system of claim 12, wherein the electronically readable format comprises at least one format selected from the group consisting of: a QR code, a magnetic strip, a bar code, and a memory storage chip.

14. A method of using a numbering system comprising:
    (a) including an identifier comprising hexadecimal, vigesimal, quadrivigesimal, or any other alphanumeric characters on a card, wherein the card comprises a gift card, a customer loyalty card, or a customer incentive card;
    (b) accessing an interface connected to a communications network;
    (c) associating the identifier with an account and manage funds associable with the account using the interface; and
    (d) associating funds data with the account to be stored on a remote server connected to the communications network, the funds data relating to the funds transferred by a user to a card issuer;
    wherein the identifier comprises a reference number that identifies an offer to create the account that is identifiable using the identifier, wherein the reference number is associable with information relating to the account, and wherein the account is associable with an account number upon creation;
    wherein the identifier is includable on the card via printing, imprinting, or both printing and imprinting;
    wherein the identifier is storable by the card in an electronically readable format;
    wherein the identifier is readable from the electronically readable format using a computerized device with a processor and memory.

15. The method of claim 14, wherein the reference number is usable to open a plurality of accounts, wherein each of the plurality of accounts is associable with a corresponding account number.

16. The system of claim 14, wherein the reference number is includable in an advertisement to solicit creation of the account, and wherein the advertisement is includable in a publication.

17. The method of claim 14, further comprising the step of:
    (e) observing the account to track purchasing habits.

18. The method of claim 14, wherein the electronically readable format comprises at least one format selected from the group consisting of: a QR code, a magnetic strip, a bar code, and a memory storage chip.

* * * * *